(12) United States Patent
Yokosawa

(10) Patent No.: US 8,762,647 B2
(45) Date of Patent: Jun. 24, 2014

(54) MULTICORE PROCESSOR SYSTEM AND MULTICORE PROCESSOR

(75) Inventor: Akira Yokosawa, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 140 days.

(21) Appl. No.: 13/238,662

(22) Filed: Sep. 21, 2011

(65) Prior Publication Data

US 2012/0324167 A1  Dec. 20, 2012

(30) Foreign Application Priority Data

Jun. 15, 2011 (JP) .................................. 2011-133546

(51) Int. Cl.
*G06F 13/00* (2006.01)
*G06F 13/28* (2006.01)

(52) U.S. Cl.
USPC ..... 711/119; 711/147; 711/163; 711/E12.002

(58) Field of Classification Search
USPC ........................... 711/119, 147, 163, E12.002
See application file for complete search history.

(56) References Cited

U.S. PATENT DOCUMENTS

2010/0250856 A1* 9/2010 Owen et al. .................... 711/128
2012/0110266 A1* 5/2012 Wilkerson et al. ............ 711/122

FOREIGN PATENT DOCUMENTS

| JP | 07-121442 | 5/1995 |
| JP | 2005-018772 | 1/2005 |
| JP | 2008-117388 | 5/2008 |
| JP | 2011-003072 | 1/2011 |

OTHER PUBLICATIONS

Yoshiro Tsuboi, et al., Nikkei Electronics, Jun. 30, 2008, pp. 105-118.

* cited by examiner

*Primary Examiner* — Edward Dudek, Jr.
(74) *Attorney, Agent, or Firm* — Sprinkle IP Law Group

(57) ABSTRACT

According to one embodiment, a multicore processor system includes: a memory region, and a multicore processor that includes plural cores, a first cache, and a second cache shared between the plural cores. The memory region permits first state in which exclusive use by using the first and second cache is granted to one core, second state in which exclusive use by using the second cache is granted to one core group, and third state in which use by using neither the first cache nor the second cache is granted to all core groups. A kernel unit writes back a first cache to the second cache when a transition of the memory region from the first state to the second state is made, and writes back a second cache to the memory region when a transition of the memory region from the second state to the third state is made.

15 Claims, 33 Drawing Sheets

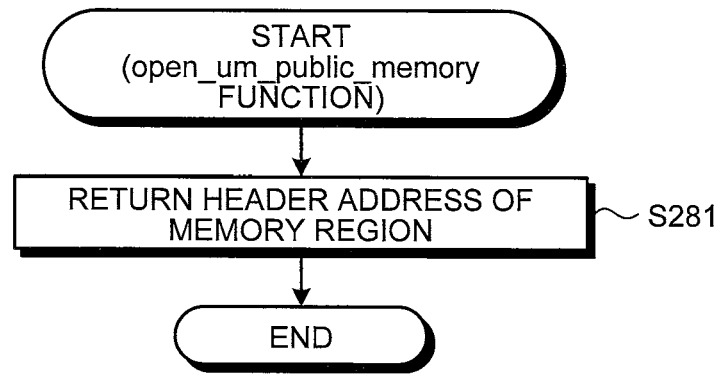
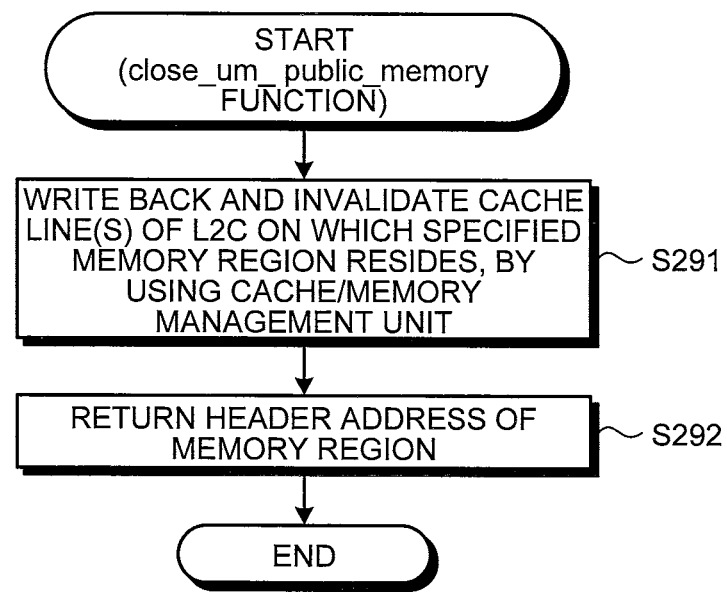

MULTICORE PROCESSOR SYSTEM AND MULTICORE PROCESSOR

CROSS-REFERENCE TO RELATED APPLICATIONS

This application is based upon and claims the benefit of priority from Japanese Patent Application No. 2011-133546, filed on Jun. 15, 2011; the entire contents of which are incorporated herein by reference.

FIELD

Embodiments described herein relate generally to a multicore processor system and a multicore processor.

BACKGROUND

For a processor that becomes a core of information processing, performance improvement is always being expected. As one of methods for improving process performance, clustering processor cores is pointed out.

Further, conventionally, to suppress increase of a chip area and power consumption, development of a technique for implementing a function of maintaining consistency of caches by software and not by a hardware mechanism has been required.

BRIEF DESCRIPTION OF THE DRAWINGS

FIG. 33 is a flowchart for explaining operation of open_um_public_memory function;

FIG. 34 is a flowchart for explaining operation of close_um_public_memory function;

DETAILED DESCRIPTION

In general, according to one embodiment, a multicore processor system includes: memory that includes a memory region; and a multicore processor that includes plural processor cores each including a first cache, and a second cache shared between the plural processor cores, in which processor cores that share the second cache form a core group of each processor core to which the memory mapping is common. The memory region is permitted to be in one of the following first to third states. The first state is a state in which reading and writing by a first access by using both the first cache and the second cache is permitted, and in which the exclusive right of use is granted to one processor core. The second state is a state in which reading and writing by a second access by using the second cache but not using the first cache is permitted, and in which the exclusive right of use is granted to one core group. The third state is a state in which reading and writing by a third access by not using either the first cache or the second cache is permitted, and in which the right of use is granted to all core groups. The multicore processor functions as a kernel unit that makes transition of the memory region between the states. The kernel unit makes transition of the memory region between the first state and the second state and between the second state and the third state. The kernel unit writes back a corresponding first cache to the second cache when the kernel unit makes transition of the memory region from the first state to the second state, and writes back a corresponding second cache to the memory region when the kernel unit makes transition of the memory region from the second state to the third state.

Exemplary embodiments of a multicore processor system and a multicore processor will be explained below in detail with reference to the accompanying drawings. The present invention is not limited to the following embodiments.

Figure 1:
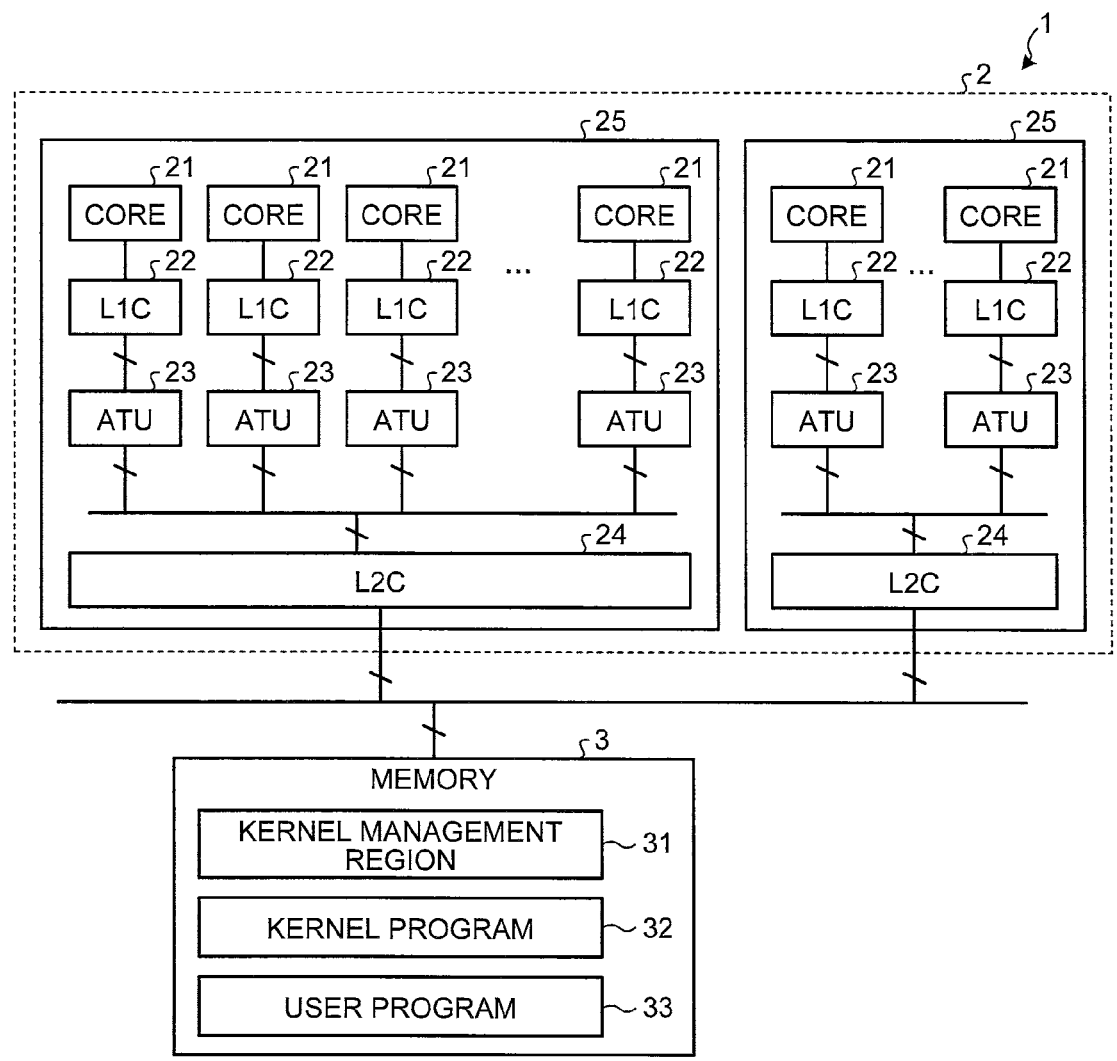
FIG. 1 is a block diagram illustrating a configuration of a multicore processor system according to a first embodiment of the present invention.

FIG. 1 is a block diagram illustrating a configuration of a multicore processor system according to a first embodiment of the present invention.

A multicore processor system 1 includes a multicore processor 2 and memory 3. The multicore processor 2 and the memory 3 are connected to each other via a bus. Respective constituent elements can be connected to each other by other network topology such as a mesh instead of the bus.

The memory 3 is configured by RAM (Random Access Memory), for example. A kernel program 32 that manages a hardware resource of the multicore processor 2 and a user program 33 that causes the multicore processor system 1 to be operated as a user desires are loaded on the memory 3. A kernel management region 31 that the multicore processor 2 can use as main memory is secured in the memory 3. The multicore processor 2 allocates memory regions within the kernel management region 31 to respective cores 21 while holding consistency of caches (L1 caches 22 and L2 caches 24 described later), by executing the kernel program 32 and the user program 33.

In the following explanation, operation that is mainly performed by the multicore processor 2 is achieved by executing the kernel program 32 or the user program 33 by the multicore processor 2 (more accurately, by the cores 21). Operation based on the kernel program 32 is sometimes expressed as the operation performed by the kernel program 32, and operation based on the user program 33 is sometimes expressed as the operation performed by a task. A source of loading the kernel program 32 and the user program 33 can be a nonvolatile memory region configured by ROM (Read Only Memory) or the like that stores the programs in advance or an external storage device. Hereinafter, the kernel program 32 is simply expressed as a kernel 32.

The multicore processor 2 includes plural cores (processor cores) 21. Each core 21 includes the L1 cache (L1C) 22. The multicore processor 2 also includes plural (two in the case of FIG. 1) clusters 25, and each core 21 belongs to any of the plural clusters 25. Each cluster 25 includes the L2 cache (L2C) 24 at a memory 3 side, and the cores 21 that belong to the same cluster 25 are connected in common within the cluster by a bus. That is, each core 21 can access the memory 3 via caches at two stages of the L1C 22 and the L2C 24. Respective constituent elements within the cluster can be connected to each other by other network topology such as a mesh instead of the bus.

Between the L1C 22 and the L2C 24, an ATU (address translation unit) 23 that translates a virtual address into a physical address is provided for each core 21. The core 21 uses a virtual address as information for specifying an access destination. When an access destination is not hit in the L1C 22, the ATU 23 translates the virtual address into a physical address, and transmits the address to the L2C 24 or the memory 3.

This indicates that a memory map of each core 21 can be mapped in the memory 3 by the ATU 23. That is, the ATU 23 can redundantly map plural memory regions on a virtual address space to a memory region on the same physical address space. In the first embodiment, plural memory regions on a virtual address space are redundantly mapped to a memory region on the physical address space. Whether the caches (the L1C 22, the L2C 24) are to be used for the access can be selected, depending on which memory region is to be accessed among the redundantly-mapped plural memory regions on a virtual address space.

Figure 2:
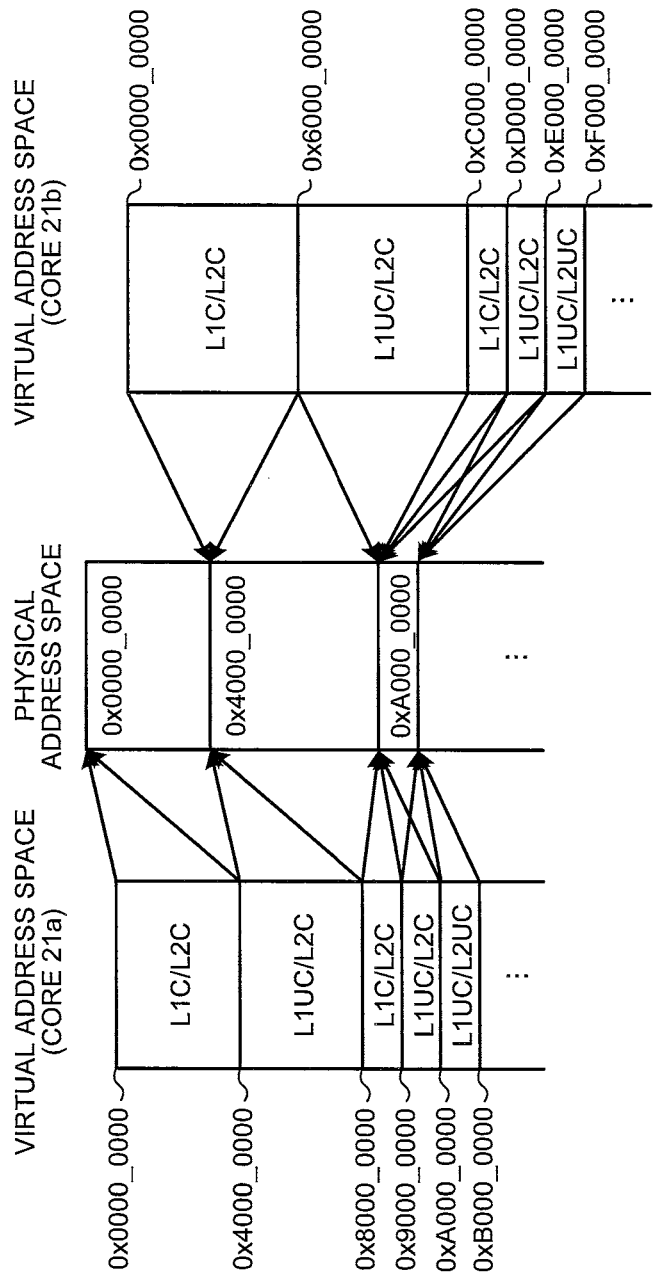
FIG. 2 is an explanatory diagram of memory mapping by an ATU.

FIG. 2 is an explanatory diagram of memory mapping by the ATU 23. To facilitate the explanation, two cores are assumed for memory mapping in this case. To distinguish between two cores 21, alphabetical subscripts a and b are attached to the end of the sign.

As illustrated in the drawing, the ATU 23 of the core 21a maps virtual addresses 0x0000_0000 to 0x3FFF_FFFF of the core 21a into physical addresses 0x0000_0000 to 0x3FFF_FFFF via both the L1C 22 and the L2C 24 (hereinafter, expressed as L1C/L2C), and maps virtual addresses 0x4000_0000 to 0x7FFF_FFFF into the same physical addresses 0x0000_0000 to 0x3FFF_FFFF not via the L1C 22 but via the L2C 24 (hereinafter, expressed as L1UC/L2C). Further, the ATU 23 maps, as a memory region to be shared between the clusters 25, virtual addresses 0x8000_0000 to 0x8FFF_FFFF into physical addresses 0xA000_0000 to 0xAFFF_FFFF, by the L1C/L2C, maps virtual addresses 0x9000_0000 to 0x9FFF_FFFF into the same physical addresses 0xA000_0000 to 0xAFFF_FFFF by the L1UC/L2C, and maps physical addresses 0xA000_0000 to 0xAFFF_FFFF into the same physical addresses 0xA000_0000 to 0xAFFF_FFFF not via either the L1C 22 or the L2C 24 (hereinafter, expressed as L1UC/L2UC).

The ATU 23 of the core 21b maps virtual addresses 0x0000_0000 to 0x5FFF_FFFF into physical addresses 0x000_0000 to 0x9FFF_FFFF by the L1C/L2C, and maps virtual addresses 0x4000_0000 to 0xBFFF_FFFF into the same physical addresses 0x000_0000 to 0x9FFF_FFFF by the L1UC/L2C. Further, the ATU 23 maps, as a memory region to be shared between the clusters 25, virtual addresses 0xC000_0000 to 0xCFFF_FFFF into physical addresses 0xA000_0000 to 0xAFFF_FFFF by the L1C/L2C, maps virtual addresses 0xD000_0000 to 0xDFFF_FFFF into the same physical addresses 0xA000_0000 to 0xAFFF_FFFF by the L1UC/L2C, and maps virtual addresses 0xE000_0000 to 0xEFFF_FFFF into the same physical addresses 0xA000_0000 to 0xAFFF_FFFF by the L1UC/L2UC.

Because virtual addresses are redundantly mapped into the memory region of the physical addresses 0xA000_0000 to 0xAFFF_FFFF from both the cores 21a and 21b, the cores 21a and 21b can share data by using this memory region. Further, the memory region on this physical address space is redundantly mapped in three memory regions including a memory region that is determined to be accessed by the L1C/L2C, a memory region that is determined to be accessed by the L1UC/L2C, and a memory region that is determined to be accessed by the L1UC/L2UC. Therefore, in this memory region on the physical address space, the cores 21a and 21b can access the memory region of the physical address space, in a desired mode among the L1C/L2C, the L1UC/L2C, and the L1UC/L2UC, by switching between the virtual addresses of access destinations. Hereinafter, a memory region to which access by the L1UC/L2C is determined and a memory region to which access by the L1UC/L2UC is determined are also expressed as shadow regions of the memory regions to which access by the L1C/L2C is determined.

According to the first embodiment, in order to keep consistency of the caches (the L1C 22 and the L2C 24) that are applied to the memory region on the physical address space mapped by plural cores 21, a MAP (memory access protocol) explained below is defined.

Figure 3:
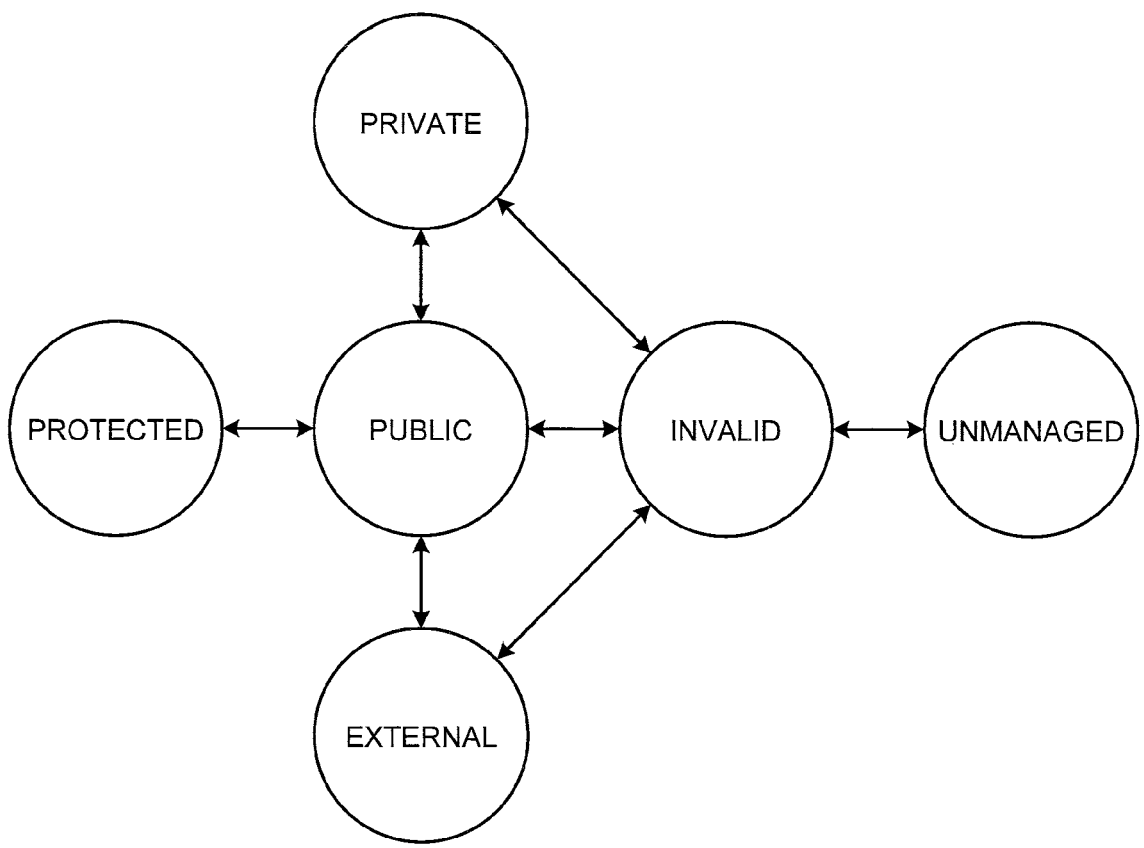
FIG. 3 is an explanatory diagram of a MAP according to the first embodiment.

FIG. 3 is an explanatory diagram of the MAP according to the first embodiment. As illustrated in the drawing, according to the MAP of the first embodiment, six attributes are defined, including an INVALID state, a PRIVATE state, a PUBLIC state, a PROTECTED state, an EXTERNAL state, and an UNMANAGED state.

(a) The INVALID state

In this state, a memory region can be allocated to a task. A memory region before allocation and after freeing belongs to this state. A task cannot access the memory region in this state at all.

(b) The PRIVATE state

In this state, only a task that has changed a memory region to this state is permitted to perform a read/write access by the L1C/L2C. This access is achieved by accessing a virtual address that is mapped in a physical memory by the L1C/L2C.

(c) The PUBLIC state

In this state, tasks (the cores 21) of which mapping set by the ATU 23 is the same share data. That is, tasks of which mapping set by the ATU 23 is the same are permitted to perform a read/write access by the L1UC/L2C. This access is achieved by accessing a virtual address that is mapped in a physical memory by the L1UC/L2C.

Figure 4:
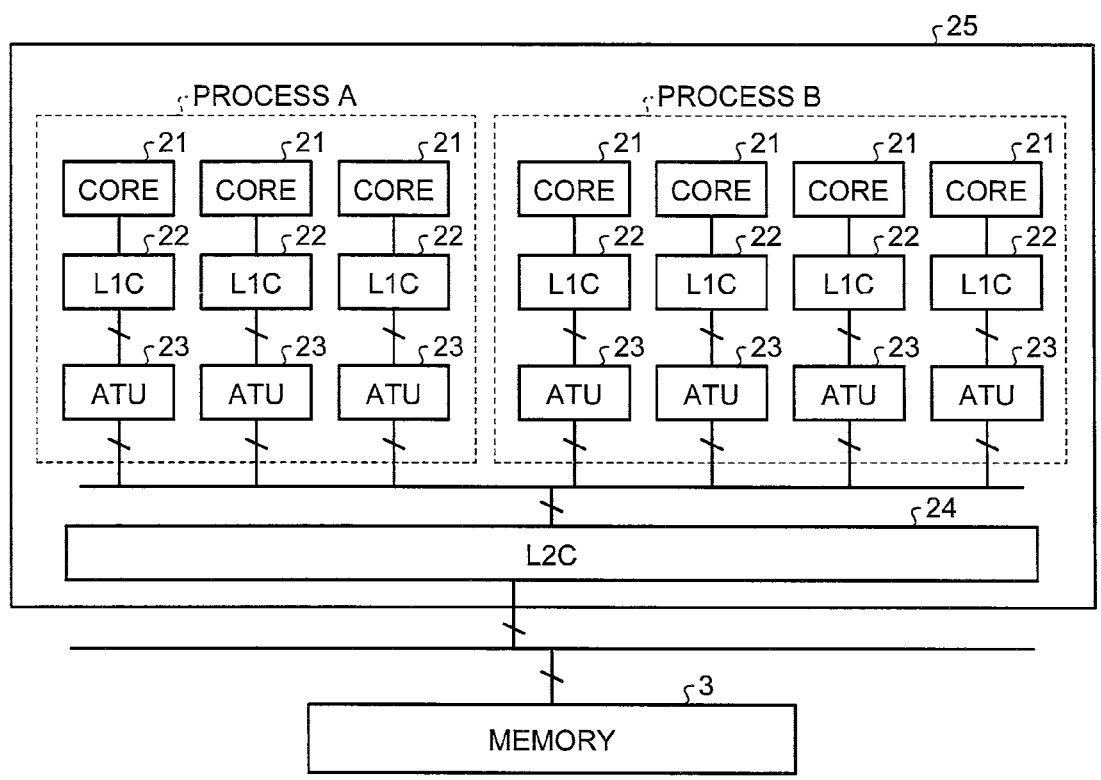
FIG. 4 is an explanatory diagram of a concept of a process.

In this case, a concept of a process (a core group) that means a group of tasks of which mapping by the ATU 23 is the same is introduced. FIG. 4 is an explanatory diagram of the concept of the process. In FIG. 4, three cores 21 (tasks) belong to a process A, and four cores 21 (tasks) belong to a process B. Tasks executed on plural cores 21, whose settings of the ATU 23 are the same, belong to the same process. That is, not only tasks that have changed memory regions to the PUBLIC state, but also all tasks that belong to the process are permitted to access the memory region in the PUBLIC state. Although plural processes can exist in one cluster 25, it is assumed that one process cannot stride over the cluster 25.

(d) The PROTECTED state

In this state, one or more tasks that belong to the same process and that have requested a transition of the memory region to this state are permitted to perform a read access by the L1C/L2C. A task cannot perform a write access to the memory region in this state at all.

(e) The EXTERNAL state

In this state, all tasks that stride over the cluster 25 are permitted to perform a read/write access by the L1UC/L2UC. This access is achieved by accessing a virtual address that is mapped in a physical memory by the L1UC/L2UC.

(f) The UNMANAGED state

This state is a state that is not managed by the kernel 32. That is, this is a portion excluding the kernel management region 31 out of memory regions that the memory 3 has. Because the kernel 32 does not manage consistency of caches in a memory region in this state, a task must hold consistency of the caches by taking responsibility, when a task uses this memory region.

A memory region that is included in the kernel management region 31 is in one of the INVALID state, the PRIVATE state, the PUBLIC state, the PROTECTED state, and the EXTERNAL state. As for the INVALID state, transition can be made between this state and the PUBLIC state, between this state and the PRIVATE state, and between this state and the EXTERNAL state. As for the PUBLIC state transition can be made between this state and the INVALID state, between this state and the PRIVATE state, between this state and the EXTERNAL state, and between this state and the PROTECTED state. Within the kernel management region 31, consistency of caches can be held, by keeping a memory access based on the definition of each state and the transition rule of a transition between states.

Figure 5:
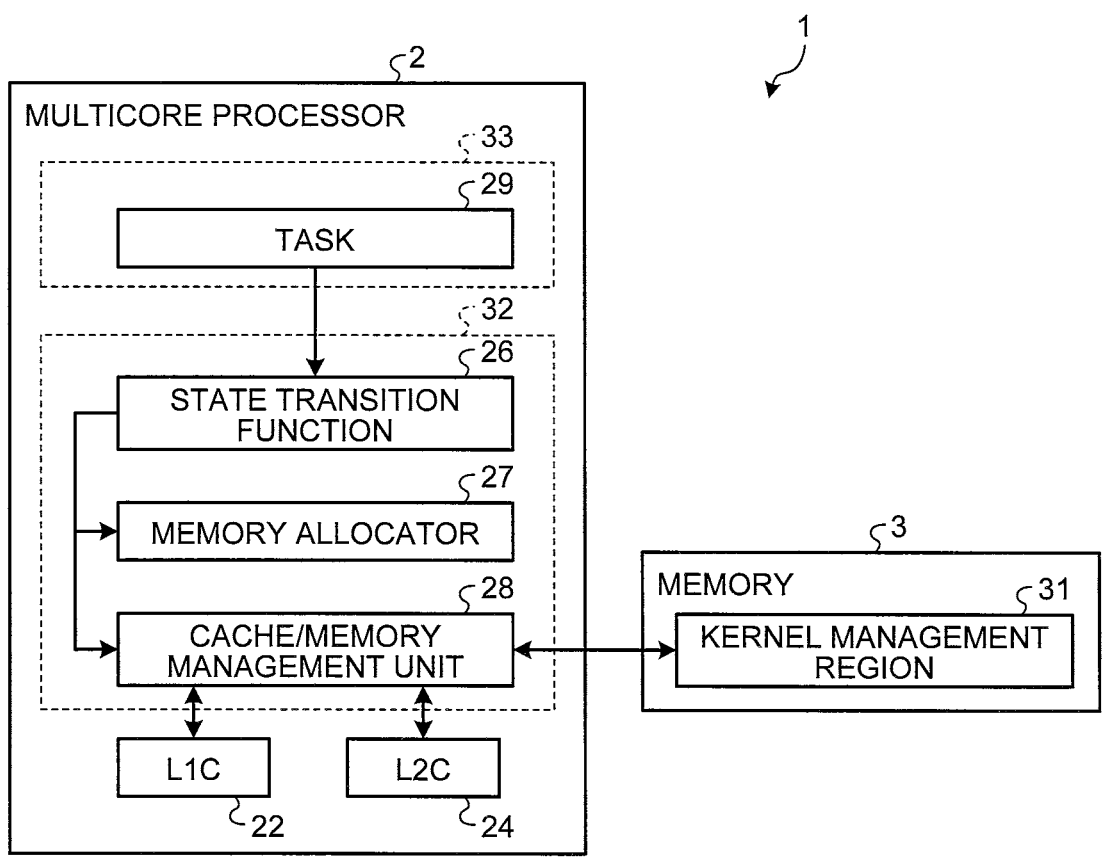
FIG. 5 is an explanatory diagram of a functional configuration of the multicore processor system according to the first embodiment of the present invention.

FIG. 5 is an explanatory diagram of a functional configuration of the multicore processor system 1 according to the first embodiment. The multicore processor 2 generates a state transition function 26, a memory allocator 27, and a cache/memory management unit 28, by executing the kernel 32. The multicore processor 2 also executes a task 29 by executing the user program 33.

The state transition function 26 is an API (Application Programming Interface) to perform a transition between the states in the MAP illustrated in FIG. 3, and functions as a kernel unit in cooperation with the memory allocator 27 and the cache/memory management unit 28. The state transition function 26 includes the following 14 functions.

(1) allocate_private_memory (size_t size)

This is a function that secures a memory region in the PRIVATE state of the size specified by an argument "size" from a memory region in the INVALID state.

(2) free_private_memory (void *addr, size_t size)

This is a function that frees a memory region in the PRIVATE state that is specified by a header address "addr" and the argument "size". The area that is freed by this function becomes the INVALID state.

(3) allocate_public_memory (size_t size)

This is a function that secures a memory region in the PUBLIC state of the size specified by the argument "size" from a memory region in the INVALID state.

(4) free_public_memory (void *addr, size_t size)

This is a function that frees a memory region in the PUBLIC state that is specified by the header address "addr" and the argument "size". The area that is freed by this function becomes the INVALID state.

(5) allocate_external_memory (size_t size)

This is a function that secures a memory region in the EXTERNAL state of the size specified by the argument "size" from a memory region in the INVALID state.

(6) free_external_memory (void *addr, size_t size)

This is a function that frees a memory region in the EXTERNAL state that is specified by the header address "addr" and the argument "size". The area that is freed by this function becomes the INVALID state.

(7) open_private_memory (void *addr, size_t size)

This is a function that changes a memory region in the PUBLIC state that is specified by the header address "addr" and the argument "size", from the PUBLIC state to the PRIVATE state.

(8) close_private_memory (void *addr, size_t size)

This is a function that changes a memory region in the PRIVATE state that is specified by the header address "addr" and the argument "size", from the PRIVATE state to the PUBLIC state.

(9) open_protected_memory (void *addr, size_t size)

This is a function that a memory region in the PUBLIC state that is specified by the header address "addr" and the argument "size", from the PUBLIC state to the PROTECTED state.

(10) close_protected_memory (void *addr, size_t size)

This is a function that changes a memory region in the PROTECTED state that is specified by the header address "addr" and the argument "size", from the PROTECTED state to the PUBLIC state.

(11) open_public_memory (void *addr, size_t size)

This is a function that changes a memory region in the EXTERNAL state that is specified by the header address "addr" and the argument "size", from the EXTERNAL state to the PUBLIC state.

(12) close_public_memory (void *addr, size_t size)

This is a function that changes a memory region in the PUBLIC state that is specified by the header address "addr" and the argument "size", from the PUBLIC state to the EXTERNAL state.

(13) enter_memory_access_protocol (void *addr, size_t size)

This is a function that changes a memory region in the UNMANAGED state that is specified by the header address "addr" and the argument "size", from the UNMANAGED state to the INVALID state.

(14) leave_memory_access_protocol (void *addr, size_t size)

This is a function that changes a memory region in the INVALID state that is specified by the header address "addr" and the argument "size", from the INVALID state to the UNMANAGED state.

The allocate functions (allocate_private_memory, allocate_public_memory, and allocate_external_memory), the free functions (free_private_memory, free_public_memory, and free_external_memory), the open functions (open_private_memory, open_protected_memory, and open_public_memory), and the close functions (close_private_memory, close_protected_memory, and close_public_memory) are called by the task 29, and the enter function (enter_memory_access_protocol) and the leave function (leave_memory_access_protocol) are called by the kernel 32 by itself.

The memory allocator 27 increases and decreases the kernel management regions 31, and allocates and frees a memory region within the kernel management region 31 to the task 29. The cache/memory management unit 28 manages cache lines of the L1C 22 and the L2C 24. The memory allocator 27 and the cache/memory management unit 28 are called from the state transition function 26 respectively.

Operation of each function that is included in the state transition function 26 in the first embodiment is explained next. In the explanation of the first embodiment, an address in a memory region on a virtual address space that is set accessible by the L1C/L2C is simply expressed as an L1C/L2C virtual address, an address in a memory region on a virtual address space that is set accessible by the L1UC/L2C is simply expressed as an L1UC/L2C virtual address, and an address in a memory region on a virtual address space that is set accessible by the L1UC/L2UC is simply expressed as an L1UC/L2UC virtual address.

Figure 6:
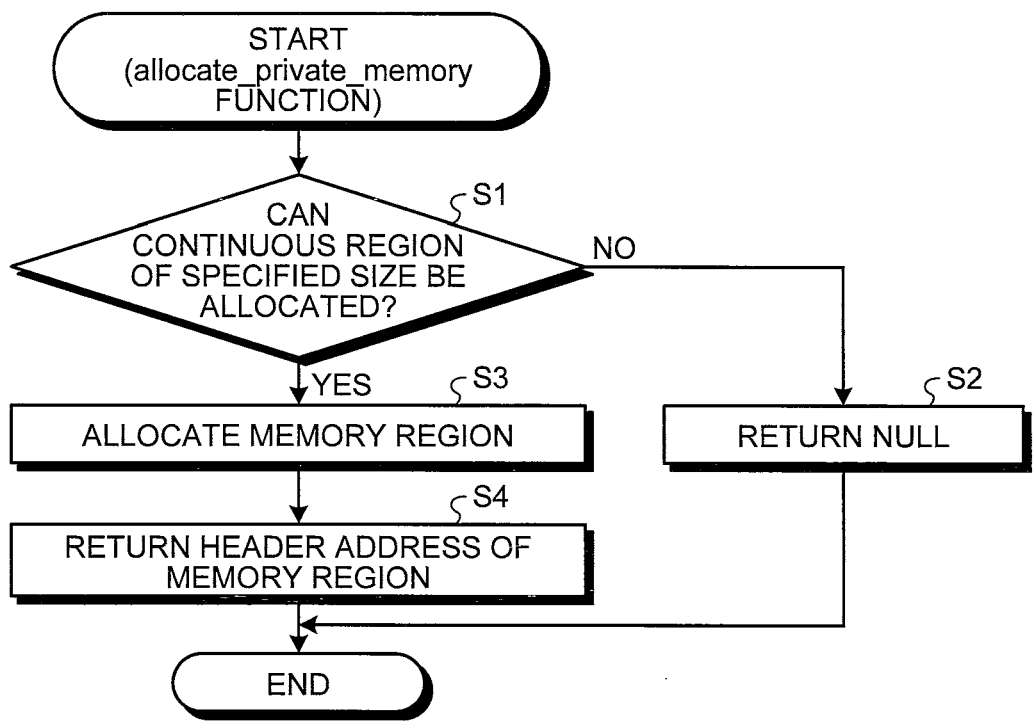
FIG. 6 is a flowchart for explaining operation of allocate_private_memory function.

FIG. 6 is a flowchart for explaining the operation of the allocate_private_memory function. When the task 29 calls the allocate_private_memory function, the allocate_private_memory function determines whether a continuous memory region of a size specified by the argument "size" can be allocated from among memory regions in the INVALID state, by using the memory allocator 27 (S1). When there is no continuous region in the INVALID state and also when allocation of a memory region is not possible (No at S1), the allocate_private_memory function returns NULL (S2), and ends the operation. When allocation of a memory region is possible (Yes at S1), the allocate_private_memory function allocates the memory region to the caller task 29, by using the memory allocator 27 (S3), returns the header address of the allocated memory region (S4), and ends the operation. The caller task 29 can recognize the memory region that is assigned by the address returned at S4 and the argument "size", as a memory region in the PRIVATE state.

Figure 7:
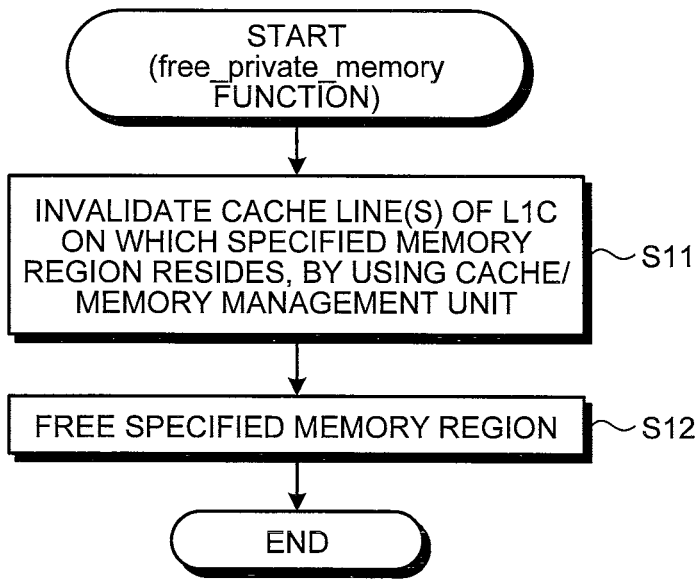
FIG. 7 is a flowchart for explaining operation of free_private_memory function.

FIG. 7 is a flowchart for explaining the operation of the free_private_memory function. When the task 29 calls the free_private_memory function, the free_private_memory function invalidates cache lines of the L1C 22 on which a memory region specified by the header address "addr" and the argument "size" resides, by using the cache/memory management unit 28 (S11). The free_private_memory function frees the memory region specified by the header address "addr" and the argument "size", by using the memory allocator 27 (S12), and ends the operation.

Figure 8:
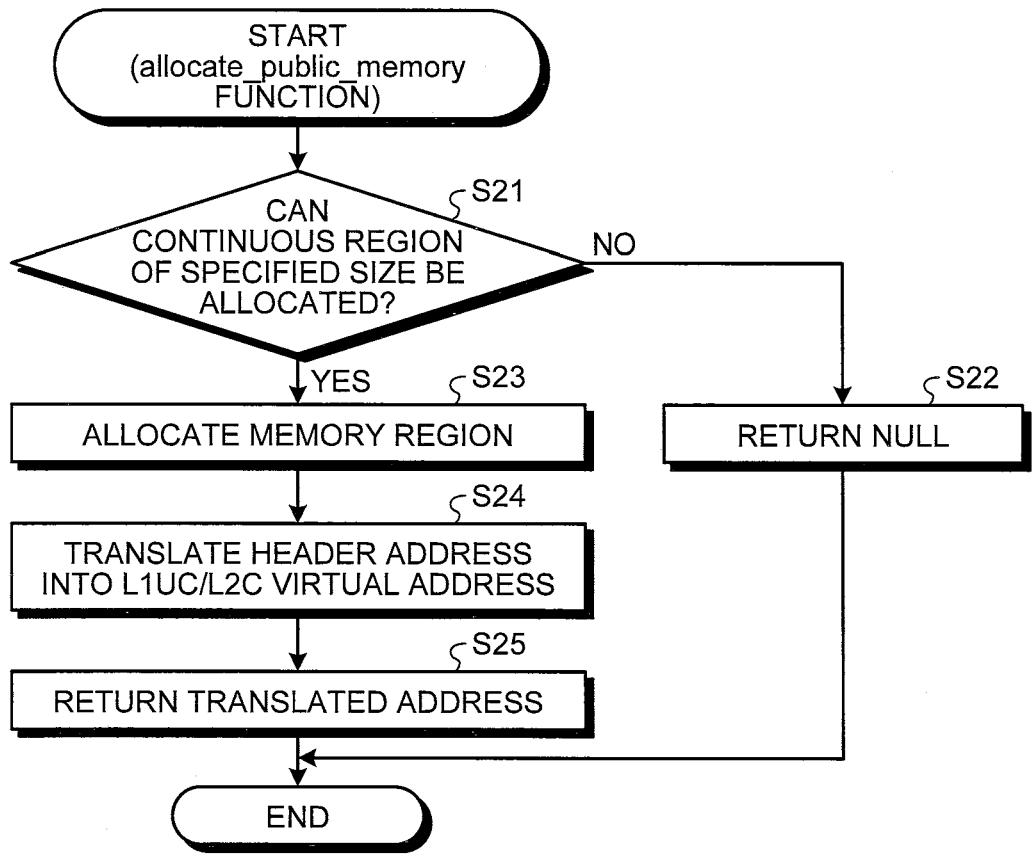
FIG. 8 is a flowchart for explaining operation of allocate_public_memory function.

FIG. 8 is a flowchart for explaining the operation of the allocate_public_memory function. When the task 29 calls the allocate_public_memory function, the allocate_public_memory function determines whether a continuous memory region of a size specified by the argument "size" can be allocated from among memory regions in the INVALID state (S21). When allocation of a memory region is not possible (No at S21), the allocate_public_memory function returns NULL (S22), and ends the operation. When allocation of a memory region is possible (Yes at S21), the allocate_public_memory function allocates the memory region to the caller task 29, by using the memory allocator 27 (S23), translates a header address of the allocated memory region into an L1UC/L2C virtual address (S24), returns the translated address to the task 29 (S25), and ends the operation. Other tasks 29 that belong to the same process as that of the caller task 29 can recognize the memory region that is assigned by the address returned at S25 and the argument "size", as a memory region in the PUBLIC state.

Figure 9:
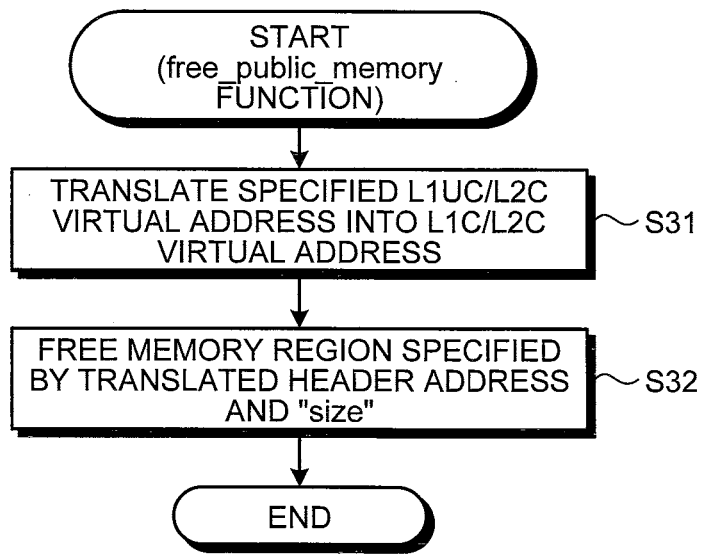
FIG. 9 is a flowchart for explaining operation of free_public_memory function.

FIG. 9 is a flowchart for explaining the operation of the free_public_memory function. When the task 29 calls the free_public_memory function, the free_public_memory function translates the specified address "addr" (L1UC/L2C virtual address) into a corresponding L1C/L2C virtual address (S31). The free_public_memory function frees a memory region having the translated address as a header and the size specified by the argument "size", by using the cache/memory management unit 28 (S32), and ends the operation.

Figure 10:
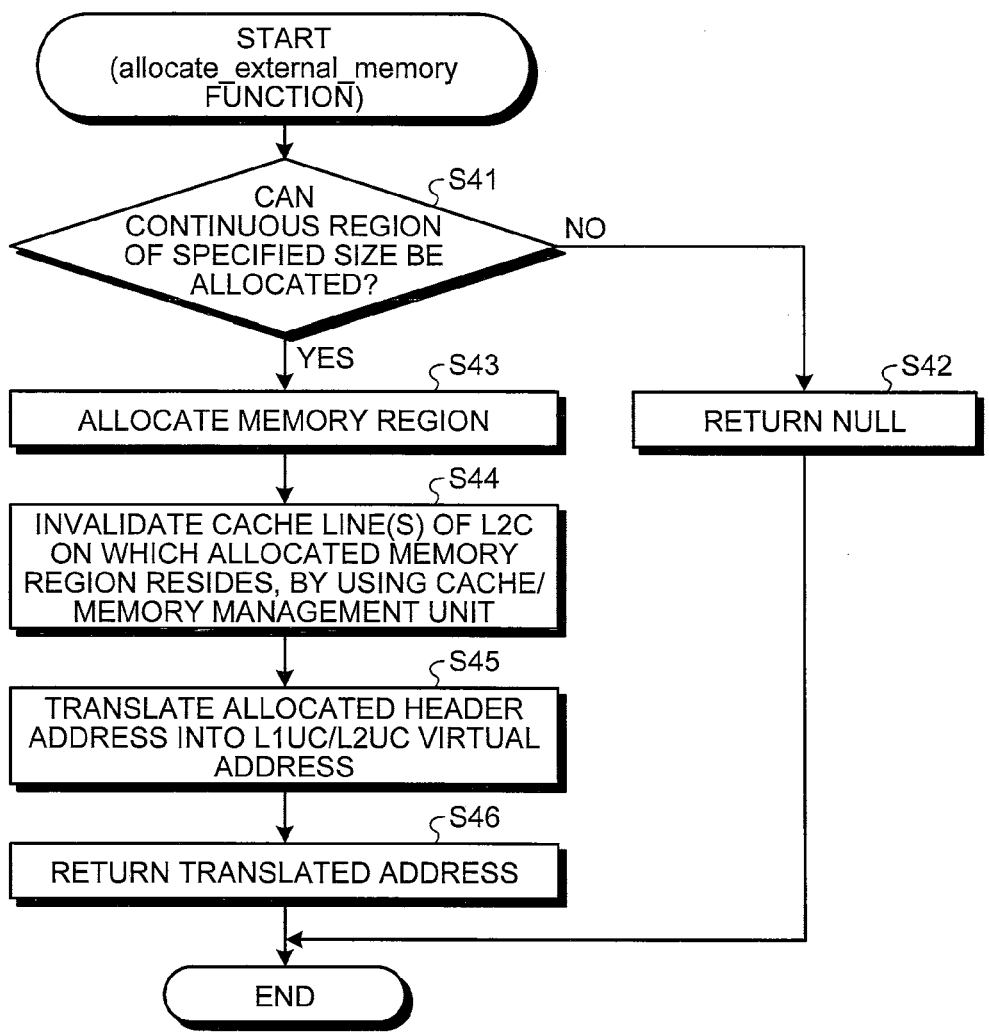
FIG. 10 is a flowchart for explaining operation of allocate_external_memory function.

FIG. 10 is a flowchart for explaining the operation of the allocate_external_memory function. When the task 29 calls the allocate_external_memory function, the allocate_external_memory function determines whether a continuous memory region of a size specified by the argument "size" can be allocated from among memory regions in the INVALID state (S41). When allocation of a memory region is not possible (No at S41), the allocate_external_memory function returns NULL (S42), and ends the operation. When allocation of a memory region is possible (Yes at S41), the allocate_external_memory function allocates the memory region to the caller task 29, by using the memory allocator 27 (S43), and invalidates cache lines of the L2C 24 on which the allocated memory region reside, by using the cache/memory management unit 28 (S44). The allocate_external_memory function translates the header address of the allocated memory region into an L1UC/L2UC virtual address (S45), returns the translated address to the task 29 (S46), and ends the operation. All tasks 29 can recognize the memory region assigned by the address returned at S46 and the argument "size" assigned by the caller task 29, as a memory region in the EXTERNAL state.

The caller task 29 can notify the address returned at S46 and the assigned argument "size" to other tasks 29 that belong to the same process and to tasks 29 that belong to other processes, thereby enabling all tasks 29 to recognize that this memory region is in the EXTERNAL state. Because the ATU 23 sets mapping differently between the processes, the address needs to be translated when it is exchanged between processes. The address can be translated by any method.

Figure 11:
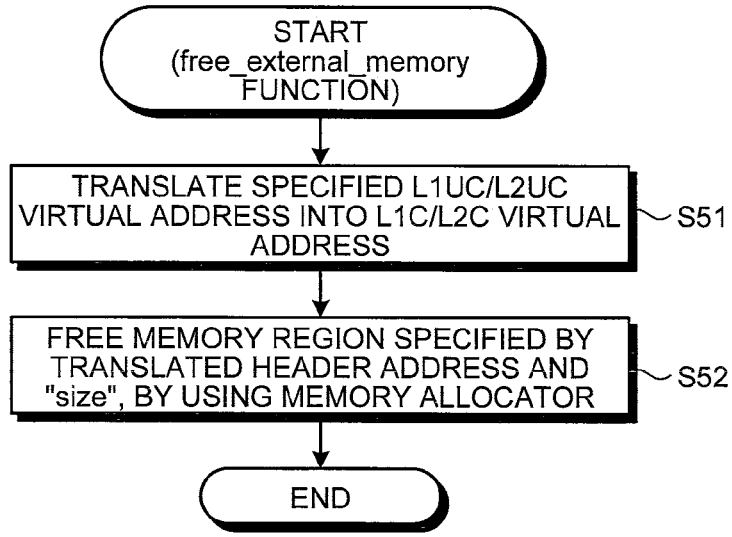
FIG. 11 is a flowchart for explaining operation of free_external_memory function.

FIG. 11 is a flowchart for explaining the operation of the free_external_memory function. When the task 29 calls the free_external_memory function, the free_external_memory function translates the specified address "addr" (L1UC/L2UC virtual address) into a corresponding L1C/L2C virtual address (S51). The free_external_memory function frees the memory region assigned by the translated address as a header and the argument "size", by using the memory allocator 27 (S52), and ends the operation.

Figure 12:
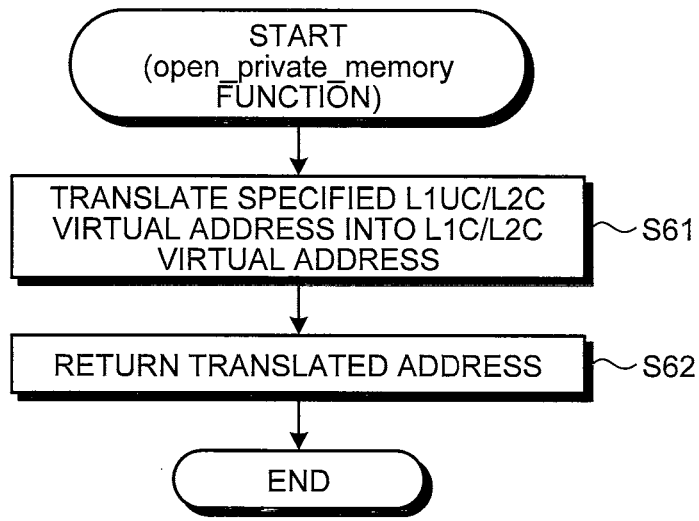
FIG. 12 is a flowchart for explaining operation of open_private_memory function.

FIG. 12 is a flowchart for explaining the operation of the open_private_memory function. When the task 29 calls the open_private_memory function, the open_private_memory function translates the specified address "addr" (L1UC/L2C virtual address) into a corresponding L1C/L2C virtual address (S61). The open_private_memory function returns the translated address to the task 29 (S62), and ends the operation. The caller task 29 can recognize the memory region assigned by the address returned at S62 and the argument "size", as a memory region in the PRIVATE state.

Figure 13:
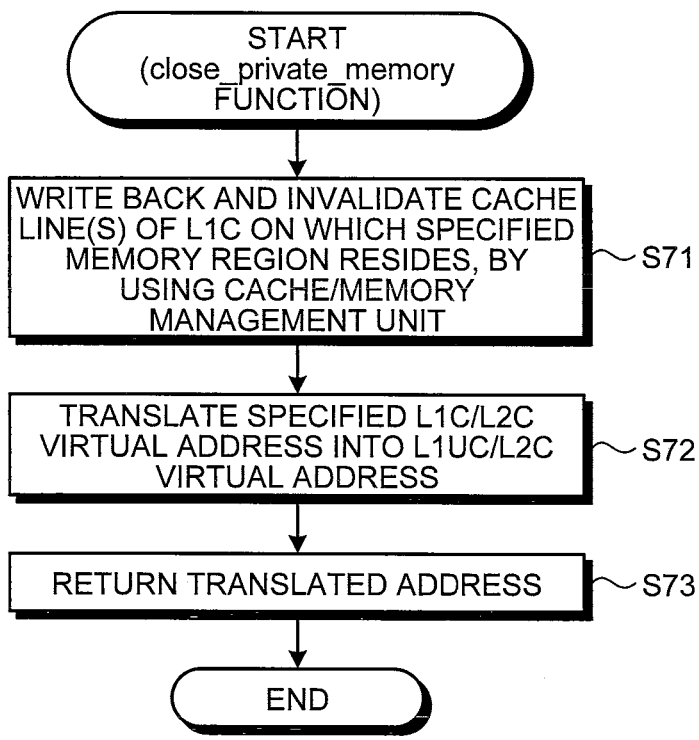
FIG. 13 is a flowchart for explaining operation of close_private_memory function.

FIG. 13 is a flowchart for explaining the operation of the close_private_memory function. When the task 29 calls the close_private_memory function, the close_private_memory function writes back the content of cache lines of the L1C 22, on which the specified memory region reside, to the L2C 24, and invalidates the cache lines of the L1C 22, by using the cache/memory management unit 28 (S71). The close_private_memory function translates the specified address "addr" (L1C/L2C virtual address) into a corresponding L1UC/L2UC virtual address (S72), returns the translated address (S73), and ends the operation. Tasks 29 that belong to the same process as that of the task caller 29 can recognize the memory region that is assigned by the address returned at S73 and the argument "size", as a memory region in the PUBLIC state.

Figure 14:
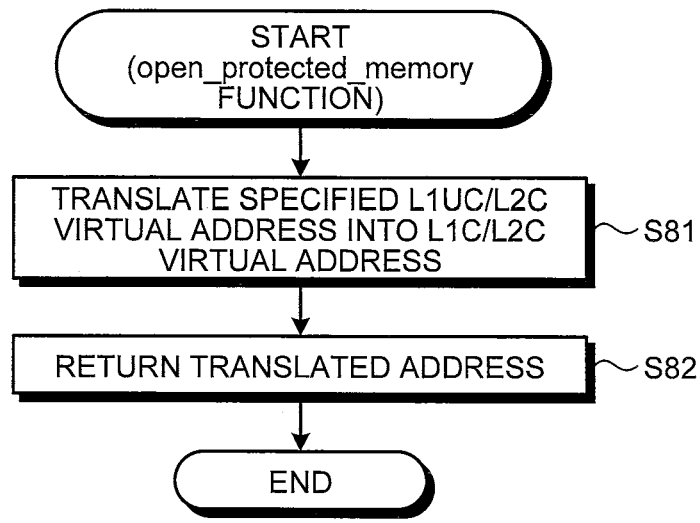
FIG. 14 is a flowchart for explaining operation of open_protected_memory function.

FIG. 14 is a flowchart for explaining the operation of the open_protected_memory function. When the task 29 calls the open_protected_memory function, the open_protected_memory function translates the specified address "addr" (L1UC/L2C virtual address) into a corresponding L1C/L2C virtual address (S81). The open_protected_memory returns the translated address (S82), and ends the operation. Tasks 29 that belong to the same process as that of the caller task 29 can recognize the memory region that is assigned by the address returned at S82 and the argument "size", as a memory region in the PUBLIC state.

Figure 15:
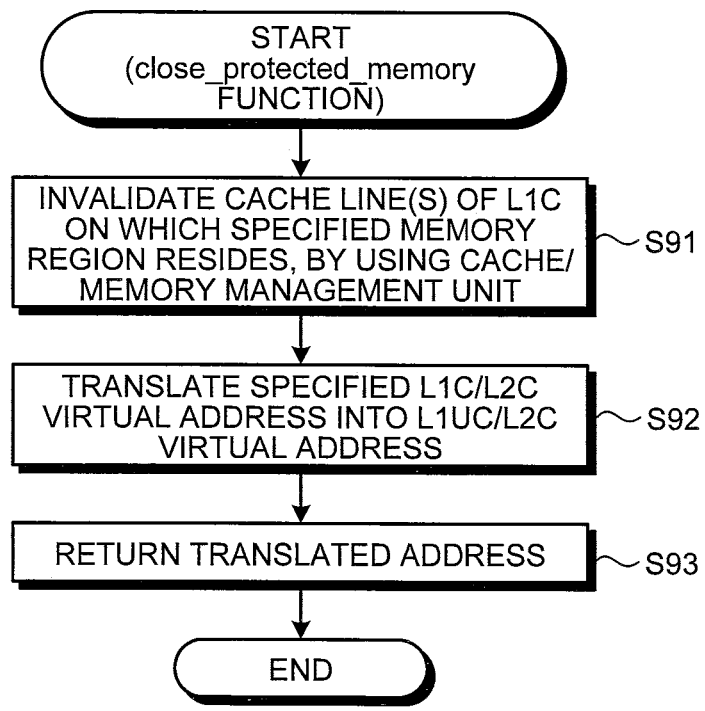
FIG. 15 is a flowchart for explaining operation of close_protected_memory function.

FIG. 15 is a flowchart for explaining the operation of the close_protected_memory function. When the task 29 calls the close_protected_memory function, the close_protected_memory function invalidates cache lines of the L1C 22 on which a memory region specified by the header address "addr" and the argument "size" reside, by using the cache/memory management unit 28 (S91). The close_protected_memory function translates the specified address "addr" (L1C/L2C virtual address) into a corresponding L1UC/L2C virtual address (S92). The close_protected_memory function returns the translated address (S93), and ends the process. Tasks 29 that belong to the same process as that of the caller task 29 can recognize the memory region that is assigned by the address returned at S93 and the argument "size", as a memory region in the PUBLIC state.

Figure 16:
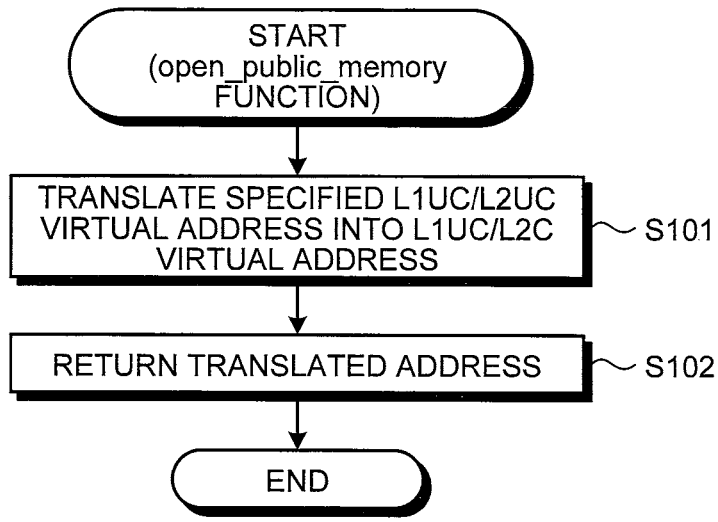
FIG. 16 is a flowchart for explaining operation of open_public_memory function.

FIG. 16 is a flowchart for explaining the operation of the open_public_memory function. When the task 29 calls the open_public_memory function, the open_public_memory function translates the specified address "addr" (L1UC/L2UC virtual address) into a corresponding L1UC/L2C virtual address (S101). Thereafter, the open_public_memory function returns the translated address (S102), and ends the process. Tasks 29 that belong to the same process as that of the caller task 29 can recognize the memory region that is assigned by the address returned at S102 and the argument "size", as a memory region in the PUBLIC state.

Figure 17:
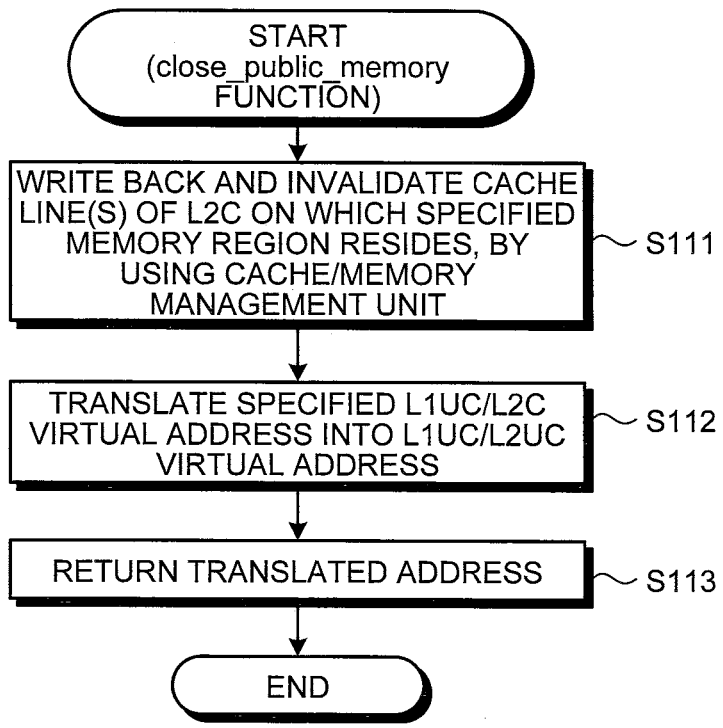
FIG. 17 is a flowchart for explaining operation of close_public_memory function.

FIG. 17 is a flowchart for explaining the operation of the close_public_memory function. When the task 29 calls the close_public_memory function, the close_public_memory function writes back the content to the memory region of cache lines of the L2C 24 on which the memory region specified by the header address "addr" and the argument "size" reside, and invalidates the cache line, by using the cache/memory management unit 28 (S111). The close_public_memory function translates the specified "addr" (L1UC/L2C virtual address) into a corresponding L1UC/L2C virtual address (S112). The close_public_memory function returns the translated address (S113), and ends the operation. All tasks 29 can recognize the memory region that is assigned by the address returned at S113 and the argument "size" assigned by the caller task 29, as a memory region in the EXTERNAL state.

Figure 18:
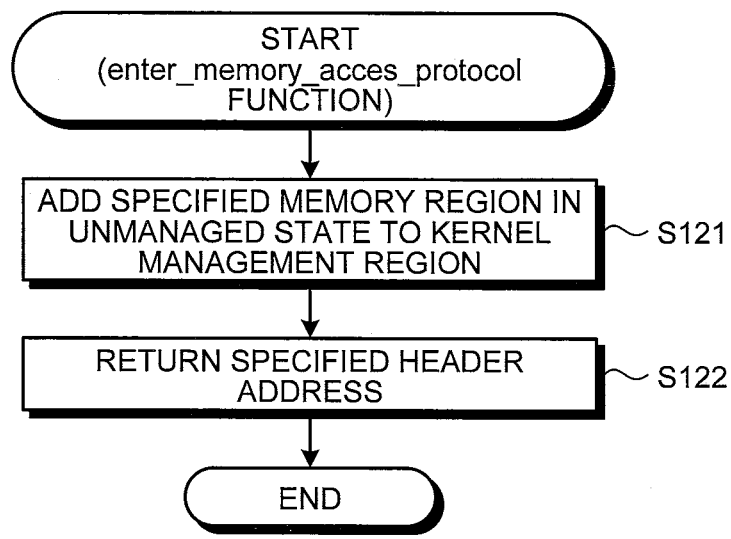
FIG. 18 is a flowchart for explaining operation of enter_memory_access_protocol function.

FIG. 18 is a flowchart for explaining the operation of the enter_memory_access_protocol function. When the kernel 32 calls the enter_memory_access_protocol function, the enter_memory_access_protocol function adds a memory region in the UNMANAGED state that is specified by the header address "addr" and the argument "size", to the kernel management region 31, by using the memory allocator 27 (S121). The enter_memory_access_protocol function returns the header address of the memory region that is added to the kernel management region 31, to the kernel 32 (S122), and ends the operation. The kernel 32 recognizes the memory region that is added to the kernel management region 31, as a memory region in an unallocated state (that is, the INVALID state).

Figure 19:
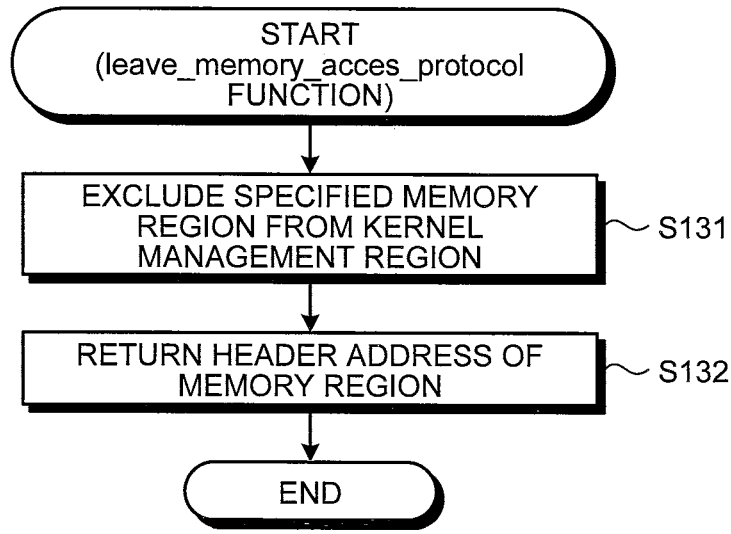
FIG. 19 is a flowchart for explaining operation of leave_memory_access_protocol function.

FIG. 19 is a flowchart for explaining the operation of the leave_memory_access_protocol function. When the kernel 32 calls the leave_memory_access_protocol function, the leave_memory_access_protocol function excludes a memory region in the INVALID state that is specified by the header address "addr" and the argument "size", from the kernel management region 31, by using the memory allocator 27 (S131). The leave_memory_access_protocol function returns the header address of the memory region that is excluded from the kernel management region 31, to the kernel 32 (S132), and ends the operation. The memory region that is excluded from the kernel management region 31 becomes in the UNMANAGED state, that is, a state that the kernel 32 does not manage.

Figure 20:
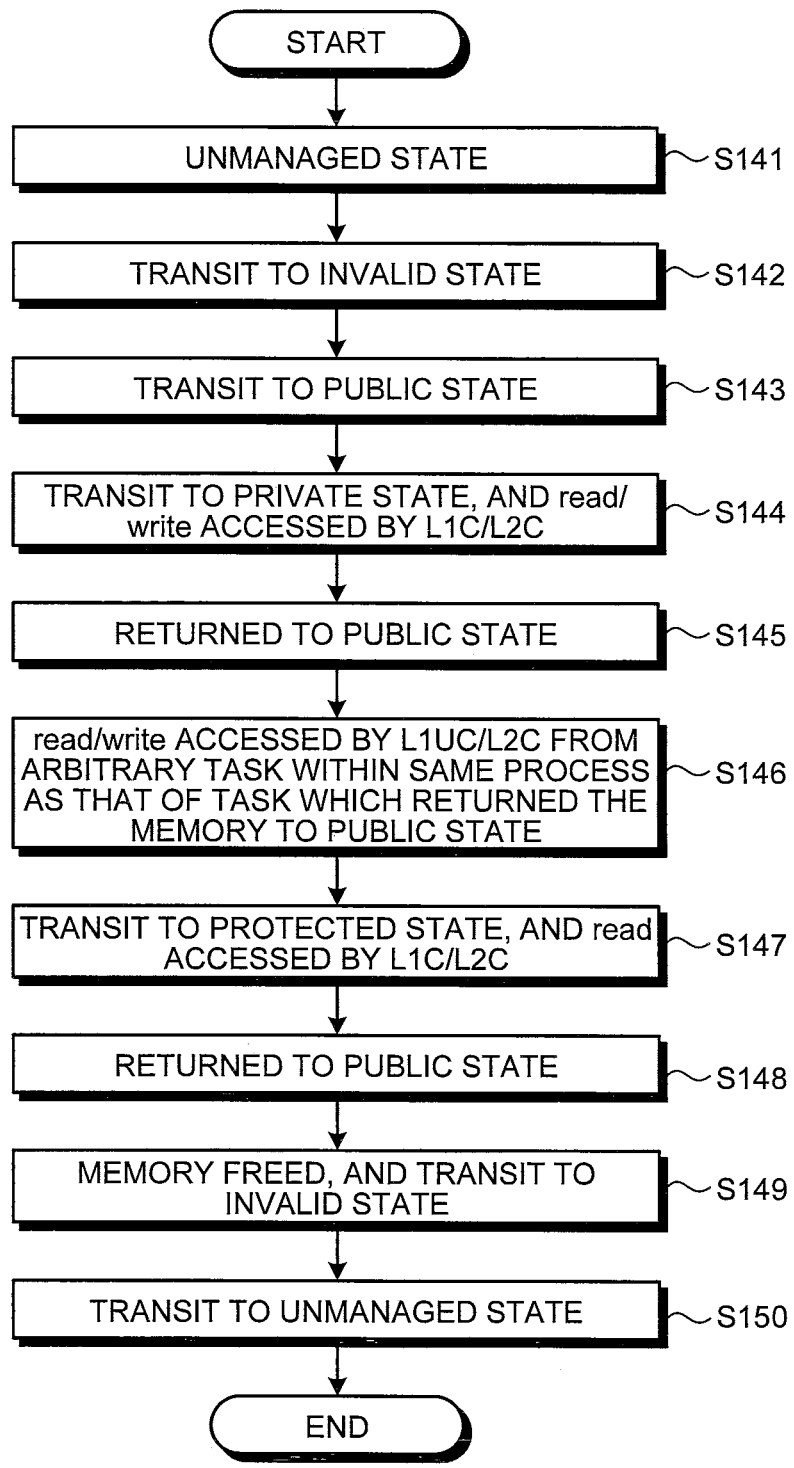
FIG. 20 is a flowchart for explaining an example of a state transition when a memory region is shared within a process.

An example of performing a state transition of a memory region by using the state transition function 26 that operates as described above is explained next. FIG. 20 is a flowchart for explaining an example of a state transition when a memory region is shared within a process.

First, a memory region is in the UNMANAGED state (S141). When the kernel 32 calls the enter_memory_access_protocol function, the enter_memory_access_protocol function changes this memory region from the UNMANAGED state to the INVALID state (S142). Next, to share data between tasks 29 within a certain process, one task 29 within this process calls the allocate_public_memory function, and the allocate_public_memory function changes the memory region from the INVALID state to the PUBLIC state (S143). Next, one task 29 within this process calls the open_private_memory function, and the open_private_memory function changes the memory region to the PRIVATE state, and the task 29 which is the caller of the open_private_memory function performs a read/write access to this memory region by the L1C/L2C (S144). During this period, other tasks 29 are not permitted to access, and therefore, the access is properly performed.

When the access ends, the task 29 which is the caller of the open_private_memory function calls the close_private_memory function, and the memory region is returned to the PUBLIC state (S145). In this case, a cache line of the L1C 22 corresponding to this memory region is properly written back to the L2C 24, and is then invalidated. Any task 29 within this process is permitted to perform read/write in the memory region that becomes in the PUBLIC state, by the L1UC/L2C virtual address (S146). Thereafter, the task 29 within this process calls the open_protected_memory function, and the open_protected_memory function changes the memory region to the PROTECTED state, and the task 29 which is the caller of the open_protected_memory function performs a read access by the L1C/L2C (S147). When the access ends, the task 29 that called the open_protected_memory function calls the close_protected_memory function, and the memory region is returned to the PUBLIC state (S148). In this case, the cache line of the L1C 22 corresponding to the memory region is properly invalidated.

One task 29 within the same process calls the free_public_memory function, and the free_public_memory function returns the memory region to the INVALID state (S149). The kernel 32 calls the leave_memory_access_protocol function, and the memory region becomes the UNMANAGED state (S150), and ends a series of operation.

Figure 21:
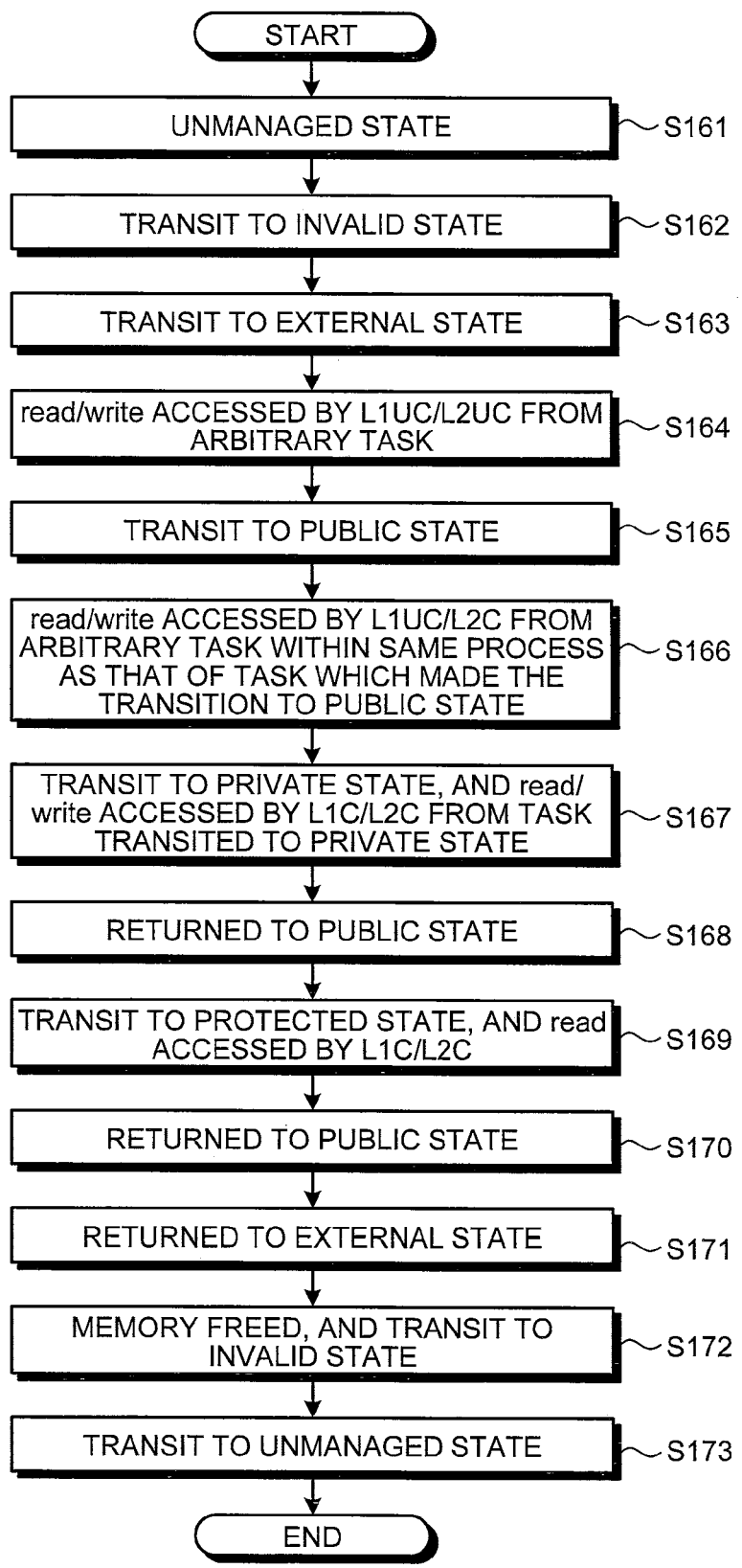
FIG. 21 is a flowchart for explaining an example of a state transition when a memory region is shared between processes.

FIG. 21 is a flowchart for explaining an example of a state transition when a memory region is shared between processes. First, a memory region is in the UNMANAGED state (S161). When the kernel 32 calls the enter_memory_access_protocol function, the enter_memory_access_protocol function changes this memory region from the UNMANAGED state to the INVALID state (S162). Next, a certain task 29 calls the allocate_external_memory function to share data between tasks 29 among plural processes, and the allocate_external_memory function invalidates a cache line corresponding to the L2C 24, and changes the memory region from the INVALID state to the EXTERNAL state (S163). In this state, any task in any process is permitted to perform a read/write access by the L1UC/L2UC virtual address (S164). However, the L1UC/L2UC virtual address that is used for this access is different for each process, as described above.

Thereafter, one task 29 in a certain process calls the open_public_memory function to exclusively use for a shared purpose within this process, and the open_public_memory function changes the memory region to the PUBLIC state (S165). In this state, all tasks 29 within the process to which the task 29 of the caller of the open_public_memory function belongs to are permitted to perform a read/write access by the L1UC/L2C virtual address (S166). Thereafter, one task 29 within this process calls the open_private_memory function to exclusively use this memory region, and the open_private_memory function changes the memory region to the PRIVATE state (S167). In this state, only the task 29 of the caller of the open_private_memory function is permitted to perform a read/write access by the L1C/L2C virtual address. After ending the access, the task 29 of the caller of the open_private_memory function calls the close_private_memory function, and the close_private_memory function returns the memory region to the PUBLIC state (S168). In this case, the cache line of the L1C 22 corresponding to this memory region is properly written back to the L2C 24, and is then invalidated.

Thereafter, one task 29 within this process calls the open_protected_memory function, and the open_protected_memory function changes the memory region to the PROTECTED state, and the task 29 of the caller of the open_protected_memory function performs a read access by the L1C/L2C (S169). When the access ends, the task 29 of the caller of the open_protected_memory function calls the close_protected_memory function, and returns the memory region to the PUBLIC state (S170). In this case, the cache line of the L1C 22 corresponding to this memory region is properly invalidated.

Thereafter, when the exclusive use by the process ends, one task 29 within this process calls the close_public_memory function, and the close_public_memory function returns the memory region to the EXTERNAL state (S171). In this case, the cache line of the L2C 24 corresponding to this memory region is properly written back to the memory 3, and is then invalidated. When a certain task calls the free_external_memory function, the free_external_memory function returns the memory region to the INVALID state (S172). When the kernel 32 calls the leave_memory_access_protocol function, the memory region becomes the UNMANAGED state (S173), and the operation ends.

As explained above, according to the first embodiment, the memory region includes the kernel unit that permits the PRIVATE state in which the L1C/L2C is allowed to read/write by access, and one task 29 (the core 21) is given the exclusive right of use, the PUBLIC state in which the L1UC/L2C is allowed to read/write by access, and one process is given the exclusive right of use, and the EXTERNAL state in which the L1UC/L2UC is allowed to read/write by access, and all tasks 29 (that is, all processes) are given the right of use, and that performs a transition between the PRIVATE state and the PUBLIC state and between the PUBLIC state and the EXTERNAL state. The kernel unit is configured to write back the corresponding L1C 22 to the L2C 24 when changing a memory region from the PRIVATE state to the PUBLIC state, and write back the corresponding L2C 24 to the memory region when changing a memory region from the PUBLIC state to the EXTERNAL state. Therefore, in the multicore processor system that includes the multicore processor in which plural cores each including a first cache form a cluster by sharing a second cache, the multicore processor system can share the memory region between the tasks 29, between the processes, and between the clusters, while holding consistency of the storage content of the first cache, the second cache, and the memory 3. That is, a multicore processor system of a cluster type can maintain consistency of the caches by software.

Further, because the kernel unit performs a transition between the PRIVATE state, the PUBLIC state, the EXTERNAL state, and the INVALID state, the kernel unit can allocate a memory region to a specific task, a specific process, or whole processes.

Further, because the kernel unit performs a transition between the PUBLIC state and the PROTECTED state, the kernel unit can read the memory from one or more tasks belonging to the same process at a high speed.

In the explanation of the first embodiment, the multicore processor system 1 does not check operation of each task 29 that is prohibited by the MAP (for example, the access operation that is prohibited in each state, and delivery of a memory region between tasks that is against the rule of a transition between states). When operation that is prohibited by the MAP is performed, consistency of the caches cannot be maintained.

To solve this problem, the state transition function 26 outputs each function by relating a state of a memory region after a transition to an identifier of the task 29 (or the process) that owns the right of use. It can be arranged such that when a function is called, whether a transition by this function is against the transition rule defined by the MAP, by referring to the output relationship. When operation that is against the transition rule is detected, a detected result can be output. There can be provided a mechanism that determines whether an access performed to the memory region is against a state of the memory region of an access destination, by referring to the relationship output by the state transition function 26.

The first embodiment can be applied not only to the multicore processor 2 that has plural clusters 25 each including plural cores 21, but also to a multicore processor that includes only one cluster 25 that includes plural cores 21.

According to the first embodiment, consistency of caches can be held in a physical memory region that has a shadow region. On the other hand, according to a second embodiment, consistency can be held in a physical memory region that has no shadow region, in which an access is permitted to only the L1 cache and the L2 cache.

A configuration of a multicore processor system according to the second embodiment is equal to that of the first embodiment, except the content of functions that are included in the state transition function 26, and therefore, a redundant explanation of the configuration excluding the functions included in the state transition function 26 is omitted.

Figure 22:
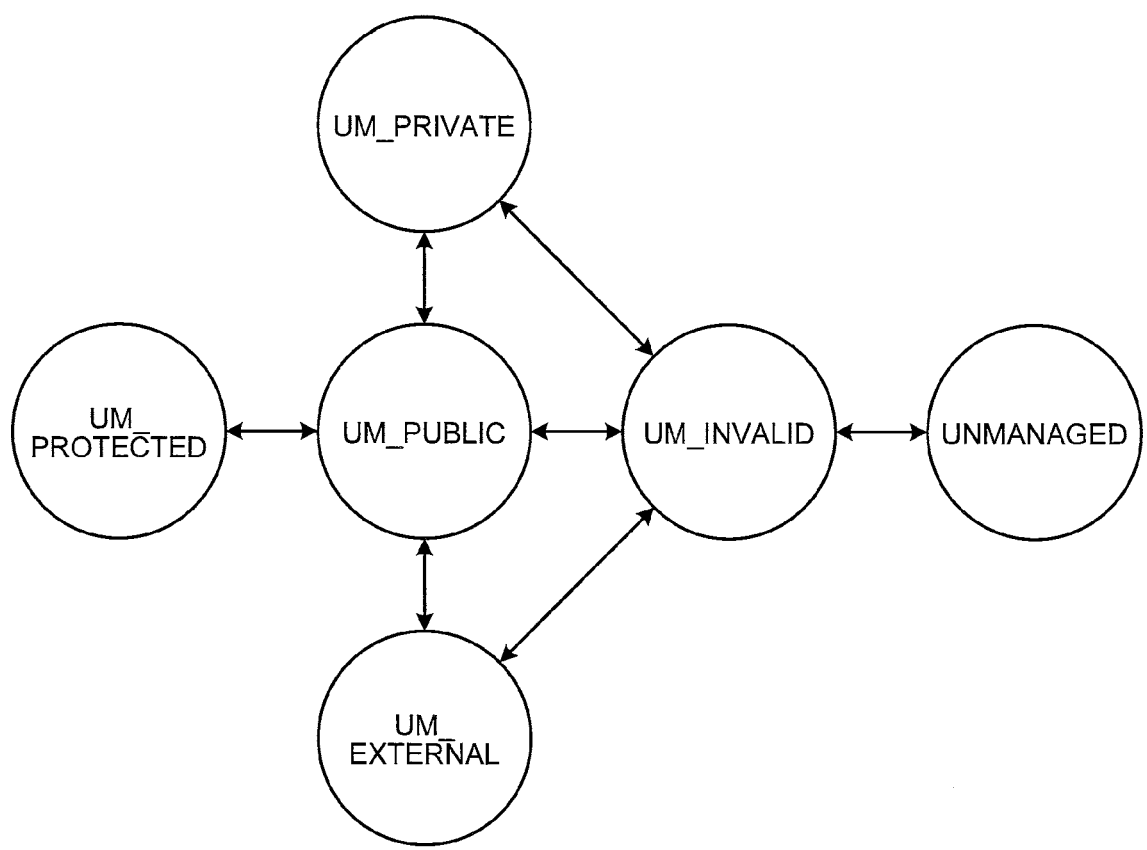
FIG. 22 is an explanatory diagram of a MAP according to a second embodiment.

FIG. 22 is an explanatory diagram of a MAP according to the second embodiment. According to the second embodiment, six attributes are defined, including a UM_INVALID state, a UM_PRIVATE state, a UM_PUBLIC state, a UM_PROTECTED state, a UM_EXTERNAL state, and an UNMANAGED state.

(g) The UM_INVALID state

In this state, the kernel 32 can allocate a memory region. A memory region before allocation and after the memory is freed belongs to this state. In this state, a task cannot access the memory region at all.

(h) The UM_PRIVATE state

In this state, only a task that has changed a memory region to this state is permitted to perform a read/write access by the L1C/L2C. This access is achieved by accessing a virtual address that is mapped in a physical memory by the L1C/L2C.

(i) The UM_PUBLIC state

In this state, tasks of which mapping set by the ATU 23 is the same, that is, tasks that belong to the same process, share data. However, a task cannot directly access a memory region in this state. Only tasks that belong to the same process are permitted to access, after changing a memory in this state to the UM_PRIVATE state or the UM_PROTECTED state.

(j) The UM_PROTECTED state

In this state, one or more tasks that belong to the same process and that have requested a transition to this state are permitted to perform a read access by the L1C/L2C. A task is not permitted to perform a write access to a memory region in this state.

(k) The UM_EXTERNAL state

In this state, all tasks share data. However, a task is not permitted to directly access a memory region in this state. A task is permitted to access a memory region, after changing the memory region to the UM_PUBLIC state, and after a task that has the same memory address mapping as that of this task changes the memory region to the UM_PRIVATE state or the UM_PUBLIC state.

(l) The UNMANAGED state

The state is the same as the UNMANAGED state in the first embodiment.

A memory region that is included in the kernel management region 31 is in one of the UM_INVALID state, the UM_PRIVATE state, the UM_PUBLIC state, the UM_PROTECTED state, and the UM_EXTERNAL state. Transition of the UM_INVALID state can be made between this state and the UM_PUBLIC state, between this state and the UM_PRIVATE state, and between this state and the UM_EXTERNAL state. Transition of the UM_PUBLIC state can be made between this state and the UM_PRIVATE state, between this state and the UM_EXTERNAL state, and between this state and the UM_PROTECTED state. Within the kernel management region 31, consistency of caches can be held, by keeping a memory access based on the definitions of the UM_INVALID state, the UM_PRIVATE state, the UM_PUBLIC state, the UM_PROTECTED state, and the UM_EXTERNAL state and the transition rule of a transition between the states.

In the second embodiment, a memory region can be also changed between the UNMANAGED state and the UM_INVALID state. With this arrangement, the kernel management region 31 can be dynamically increased or decreased.

The state transition function 26 in the second embodiment is an API (Application Programming Interface) to perform a transition between the states defined above. The state transition function 26 includes the following 14 functions.

(15) allocate_um_private_memory (size_t size)

This is a function that secures a memory region in the UM_PRIVATE state of the size specified by the argument "size".

(16) free_um_private_memory (void *addr, size_t size)

This is a function that frees a memory region in the UM_PRIVATE state that is specified by a header address "addr" and the argument "size".

(17) allocate_um_public_memory (size_t size)

This is a function that secures a memory region in the UM_PUBLIC state of the size specified by the argument "size".

(18) free_um_public_memory (void *addr, size_t size)
This is a function that frees a memory region in the UM_PUBLIC state that is specified by the header address "addr" and the argument "size".

(19) allocate_um_external_memory (size_t size)
This is a function that secures a memory region in the UM_EXTERNAL state of the size specified by the argument "size".

(20) free_um_external_memory (void *addr, size_t size)
This is a function that frees a memory region in the UM_EXTERNAL state that is specified by the header address "addr" and the argument "size".

(21) open_um_private_memory (void *addr, size_t size)
This is a function that changes a memory region in the UM_PUBLIC state that is specified by the header address "addr" and the argument "size", from the UM_PUBLIC state to the UM_PRIVATE state.

(22) close_um_private_memory (void *addr, size_t size)
This is a function that changes a memory region in the UM_PRIVATE state that is specified by the header address "addr" and the argument "size", from the UM_PRIVATE state to the UM_PUBLIC state.

(23) open_um_protected_memory (void *addr, size_t size)
This is a function that changes a memory region in the UM_PUBLIC state that is specified by the header address "addr" and the argument "size", from the UM_PUBLIC state to the UM_PROTECTED state.

(24) close_um_protected_memory (void *addr, size_t size)
This is a function that changes a memory region in the UM_PROTECTED state that is specified by the header address "addr" and the argument "size", from the UM_PROTECTED state to the UM_PUBLIC state.

(25) open_um_public_memory (void *addr, size_t size)
This is a function that changes a memory region in the UM_EXTERNAL state that is specified by the header address "addr" and the argument "size", from the UM_EXTERNAL state to the UM_PUBLIC state.

(26) close_um_public_memory (void *addr, size_t size)
This is a function that changes a memory region in the UM_PUBLIC state that is specified by the header address "addr" and the argument "size", from the UM_PUBLIC state to the UM_EXTERNAL state.

(27) enter_um_memory_access_protocol (void *addr, size_t size)
This is a function that changes a memory region in the UNMANAGED state that is specified by the header address "addr" and the argument "size", from the UNMANAGED state to the UM_INVALID state.

(28) leave_um_memory_access_protocol (void *addr, size_t size)
This is a function that changes a memory region in the UM_INVALID state that is specified by the header address "addr" and the argument "size", from the UM_INVALID state to the UNMANAGED state.

The allocate functions (allocate_um_private_memory, allocate_um_public_memory, and allocate_um_external_memory), the free functions (free_um_private_memory, free_um_public_memory, and free_um_external_memory), the open functions (open_um_private_memory, open_um_protected_memory, and open_um_public_memory), and the close functions (close_um_private_memory, close_um_protected_memory, and close_um_public_memory) are called by the task 29, and the enter function (enter_um_memory_access_protocol) and the leave function (leave_um_memory_access_protocol) are called by the kernel 32 by itself.

Operation of each function that is included in the state transition function 26 in the second embodiment is explained next. In the explanation of the second embodiment, for physical memory regions that have no corresponding shadow spaces, only memory areas on a virtual address space that is set accessible by the L1C/L2C is allocated. The address in a memory region on a virtual address space is simply expressed as an L1C/L2C virtual address.

Figure 23:
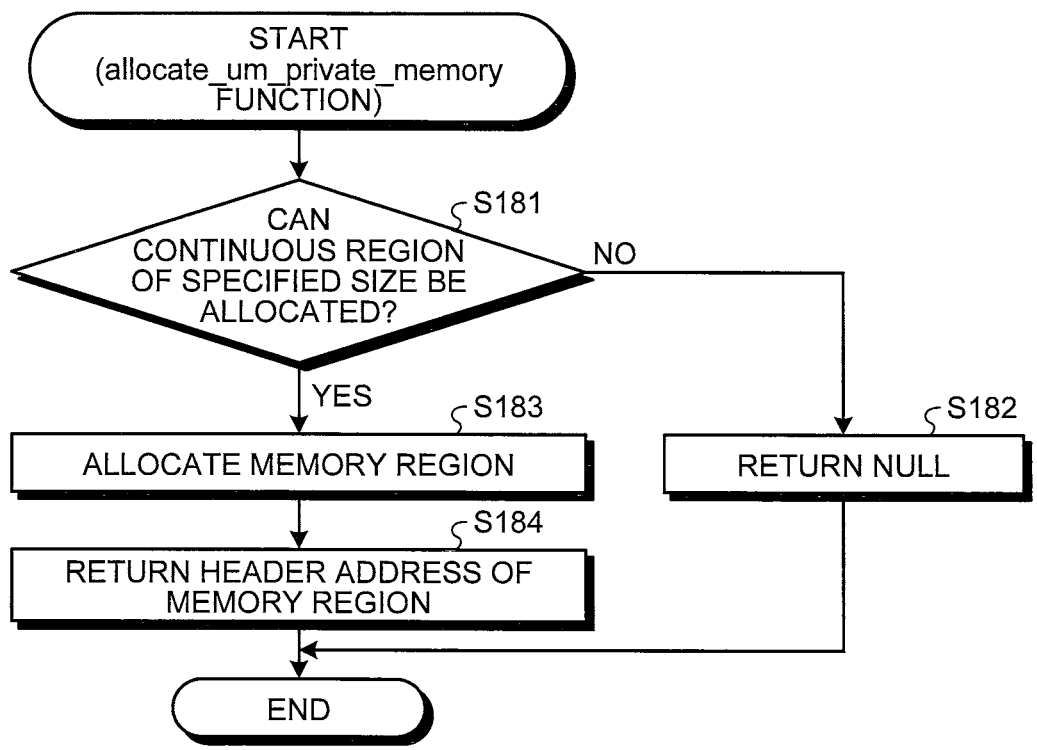
FIG. 23 is a flowchart for explaining operation of allocate_um_private_memory function.

FIG. 23 is a flowchart for explaining the operation of the allocate_um_private_memory function. When the task 29 calls the allocate_um_private_memory function, the allocate_um_private_memory function determines whether a continuous memory region of a size specified by the argument "size" can be allocated from among memory regions in the UM_INVALID state, by using the memory allocator 27 (S181). When there is no continuous region in the UM_INVALID state and allocation of a memory region is not possible (No at S181), the allocate_um_private_memory function returns NULL (S182), and ends the operation. When allocation of a memory region is possible (Yes at S181), the allocate_um_private_memory function allocates the memory region to the caller task 29, by using the memory allocator 27 (S183), returns the header address of the allocated memory region to the task 29 (S184), and ends the operation. The caller task 29 can recognize the memory region that is assigned by the address returned at S184 and the argument "size", as a memory region in the UM_PRIVATE state.

Figure 24:
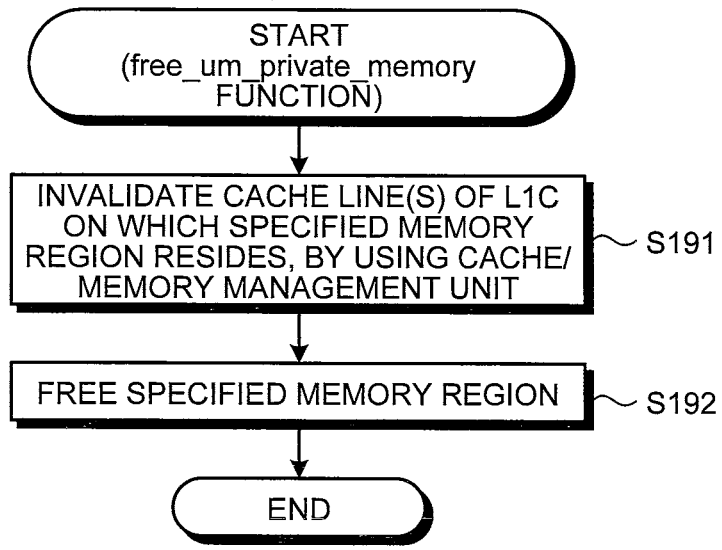
FIG. 24 is a flowchart for explaining operation of free_um_private_memory function.

FIG. 24 is a flowchart for explaining the operation of the free_um_private_memory function. When the task 29 calls the free_um_private_memory function, the free_um_private_memory function invalidates cache lines of the L1C 22 on which a memory region specified by the header address "addr" and the argument "size" resides, by using the cache/memory management unit 28 (S191). The free_um_private_memory function frees the memory region specified by the header address "addr" and the argument "size", by using the memory allocator 27 (S192), and ends the operation.

Figure 25:
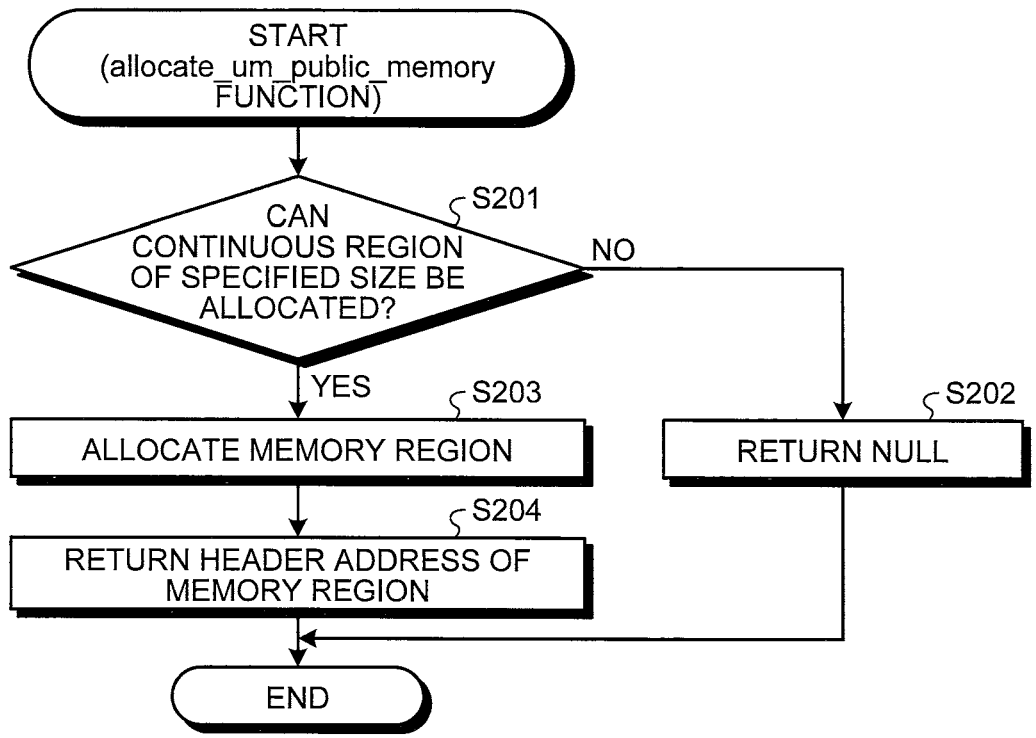
FIG. 25 is a flowchart for explaining operation of allocate_um_public_memory function.

FIG. 25 is a flowchart for explaining the operation of the allocate_um_public_memory function. When the task 29 calls the allocate_um_public_memory function, the allocate_um_public_memory function determines whether a continuous memory region of a size specified by the argument "size" can be allocated from among memory regions in the UM_INVALID state, by using the memory allocator 27 (S201). When allocation of a memory region is not possible (No at S201), the allocate_um_public_memory function returns NULL (S202), and ends the operation. When allocation of a memory region is possible (Yes at S201), the allocate_um_public_memory function allocates the memory region to the caller task 29, by using the memory allocator 27 (S203), and returns the header address of the allocated memory region to the task 29 (S204), and ends the operation. Tasks 29 that belong to the same process as that of the caller task 29 can recognize the memory region that is assigned by the address returned at S204 and the argument "size", as a memory region in the UM_PUBLIC state.

The caller task 29 can notify the memory region that is assigned by the address returned at 5204 and the argument "size", to other tasks 29 that belong to the same process, and these other tasks 29 that belong to the same process recognize this memory region as the memory region in the UM_PUBLIC state.

Figure 26:
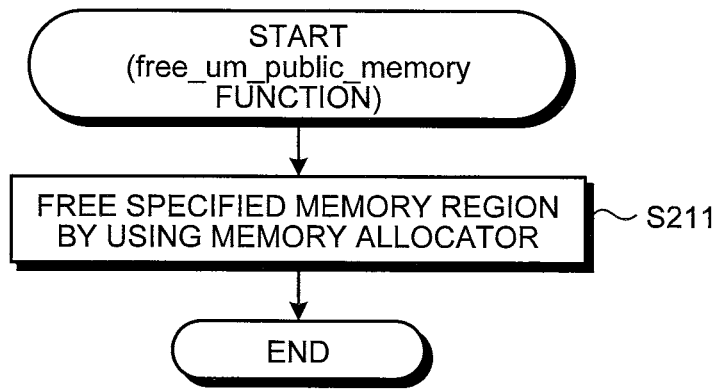
FIG. 26 is a flowchart for explaining operation of free_um_public_memory function.

FIG. 26 is a flowchart for explaining the operation of the free_um_public_memory function. When the task 29 calls the free_um_public_memory function, the free_um_public_memory function frees the specified memory region by using the memory allocator 27 (S211), and ends the operation.

Figure 27:
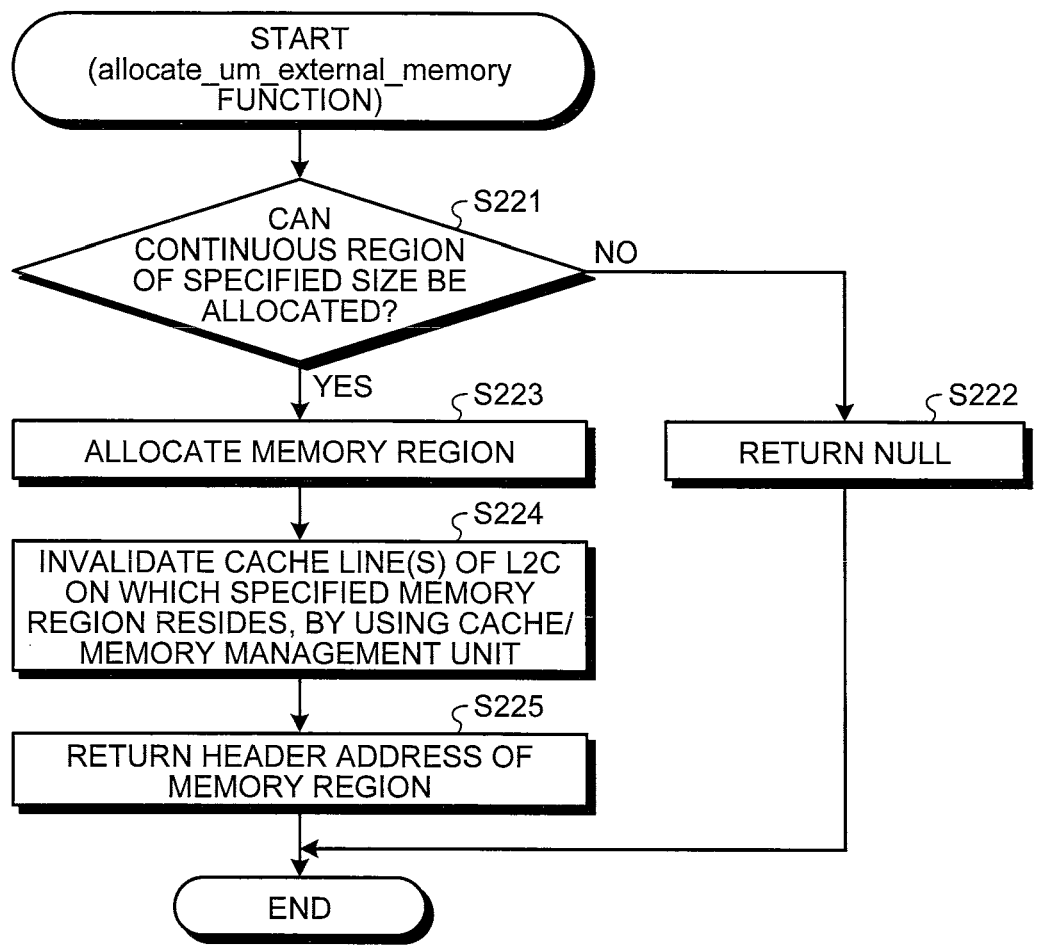
FIG. 27 is a flowchart for explaining operation of allocate_um_external_memory function.

FIG. 27 is a flowchart for explaining the operation of the allocate_um_external_memory function. When the task 29 calls the allocate_um_external_memory function, the allocate_um_external_memory function determines whether a continuous memory region of a size specified by the argument "size" can be allocated from among memory regions in the UM_INVALID state, by using the memory allocator 27 (S221). When allocation of a memory region is not possible (No at S221), the allocate_um_external_memory function returns NULL (S222), and ends the operation. When allocation of a memory region is possible (Yes at S221), the allocate_um_external_memory function allocates the memory region to the caller task 29, by using the memory allocator 27 (S223), and invalidates cache lines of the L2C 24 on which the allocated memory region resides, by using the cache/memory management unit 28 (S224). The allocate_um_external_memory function returns the header address of the allocated memory region to the task 29 (S225), and ends the operation. All tasks 29 can recognize the memory region assigned by the address returned at S225 and the argument "size" specified by the caller task 29, as a memory region in the UM_EXTERNAL state.

The caller task 29 can notify the address returned at S225 and the specified argument "size" to other tasks 29 that belong to the same process and to tasks 29 that belong to other processes, thereby enabling all tasks 29 to recognize that this memory region is in the UM_EXTERNAL state. Because the ATU 23 sets mapping differently between the processes, the address needs to be translated when it is exchanged between processes. The address can be translated by any method.

Figure 28:
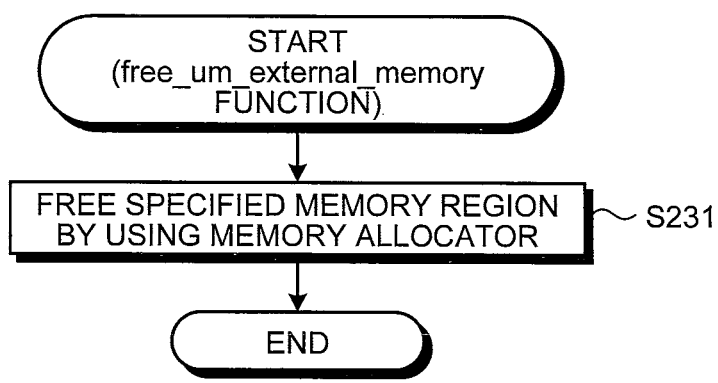
FIG. 28 is a flowchart for explaining operation of free_um_external_memory function.

FIG. 28 is a flowchart for explaining the operation of the free_um_external_memory function. When the task 29 calls the free_um_external_memory function, the free_um_external_memory function frees the specified memory region, by using the memory allocator 27 (S231), and ends the operation.

Figure 29:
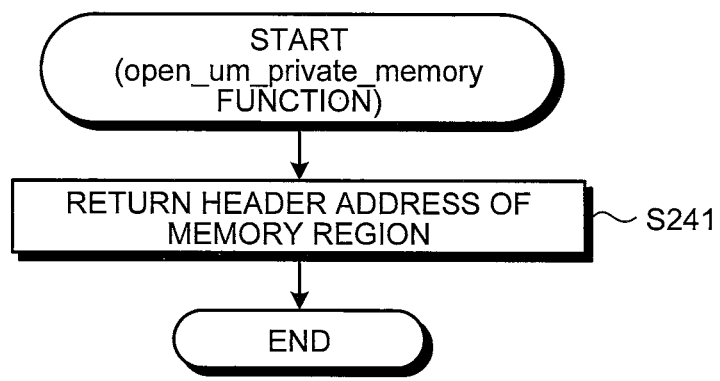
FIG. 29 is a flowchart for explaining operation of open_um_private_memory function.

FIG. 29 is a flowchart for explaining the operation of the open_um_private_memory function. When the task 29 calls the open_um_private_memory function, the open_um_private_memory function returns the header address of the specified memory region to the task 29 (S241), and ends the operation. The caller task 29 can recognize the memory region specified by the address returned at S241 and the argument "size", as a memory region in the UM_PRIVATE state.

Figure 30:
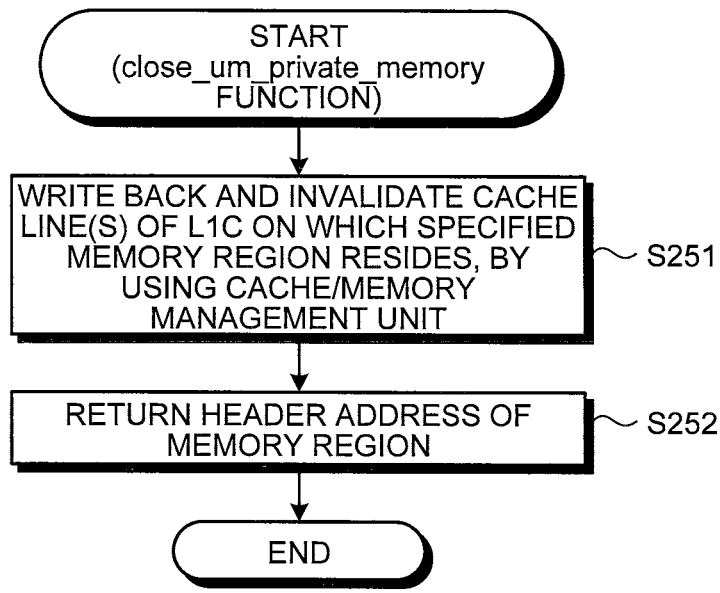
FIG. 30 is a flowchart for explaining operation of close_um_private_memory function.

FIG. 30 is a flowchart for explaining the operation of the close_um_private_memory function. When the task 29 calls the close_um_private_memory function, the close_um_private_memory function writes back the content to the L2C 24 of cache lines of the L1C 22 on which the assigned memory region resides, and invalidates these cache lines, by using the cache/memory management unit 28 (S251). The close_um_private_memory function returns the header address of the specified memory region (S252), and ends the operation. Tasks 29 that belong to the same process as that of the caller task 29 can recognize the memory region that is assigned by the address returned at S252 and the argument "size", as a memory region in the UM_PUBLIC state.

Figure 31:
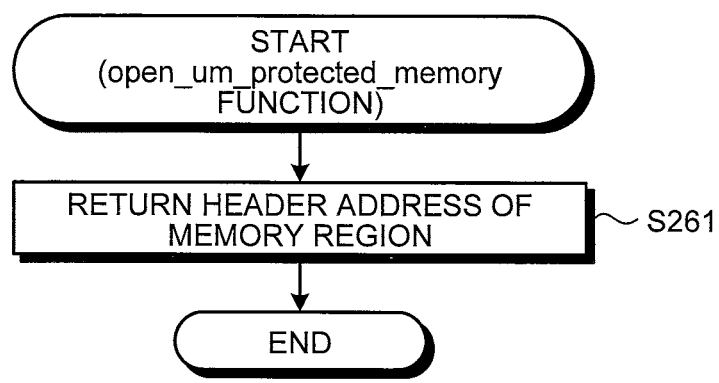
FIG. 31 is a flowchart for explaining operation of open_um_protected_memory function.

FIG. 31 is a flowchart for explaining the operation of the open_um_protected_memory function. When the task 29 calls the open_um_protected_memory function, the open_um_protected_memory function returns the header address of the specified memory region (S261), and ends the operation. Tasks 29 that belong to the same process as that of the caller task 29 can recognize the memory region that is assigned by the address returned at S261 and the argument "size", as a memory region in the UM_PUBLIC state.

Figure 32:
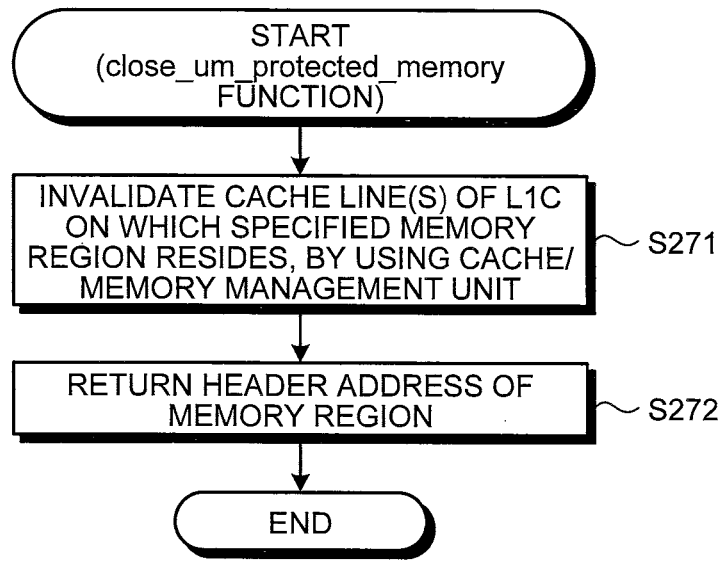
FIG. 32 is a flowchart for explaining operation of close_um_protected_memory function.

FIG. 32 is a flowchart for explaining the operation of the close_um_protected_memory function. When the task 29 calls the close_um_protected_memory function, the close_um_protected_memory function invalidates cache lines of the L1C 22 on which the assigned memory region resides, by using the cache/memory management unit 28 (S271). The close_um_protected_memory function returns the header address of the specified memory region (S272), and ends the process. Tasks 29 that belong to the same process as that of the caller task 29 can recognize the memory region that is assigned by the address returned at S272 and the argument "size", as a memory region in the UM_PUBLIC state.

FIG. 33 is a flowchart for explaining the operation of the open_um_public_memory function. When the task 29 calls the open_um_public_memory function, the open_um_public_memory function returns the header address of the specified memory region (S281), and ends the process. Tasks 29 that belong to the same process as that of the caller task 29 can recognize the memory region that is assigned by the address returned at S281 and the argument "size", as a memory region in the UM_PUBLIC state.

FIG. 34 is a flowchart for explaining the operation of the close_um_public_memory function. When the task 29 calls the close_um_public_memory function, the close_um_public_memory function writes back the content to the memory region of cache lines of the L2C 24 on which the specified memory region resides, and invalidates the cache lines, by using the cache/memory management unit 28 (S291). The close_um_public_memory function returns the header address of the specified memory region (S292), and ends the operation. All tasks 29 can recognize the memory region that is assigned by the address returned at S292 and the argument "size" specified by the caller task 29, as a memory region in the UM_EXTERNAL state.

Figure 35:
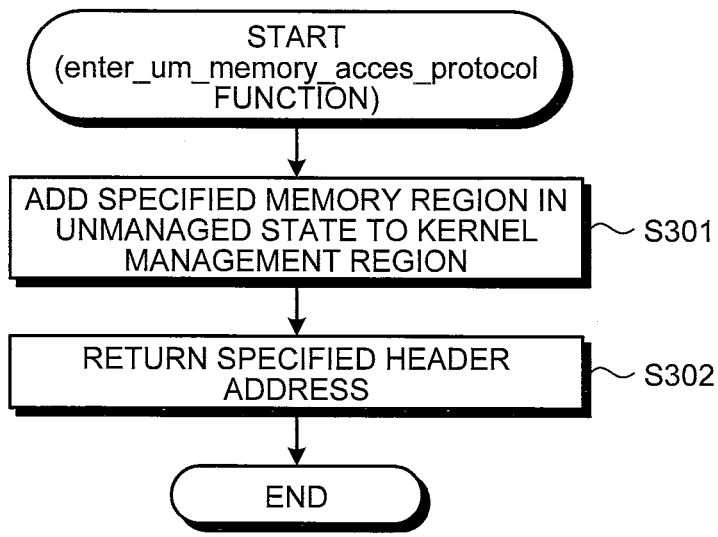
FIG. 35 is a flowchart for explaining operation of enter_um_memory_access_protocol function.

FIG. 35 is a flowchart for explaining the operation of the enter_um_memory_access_protocol function. When the kernel 32 calls the enter_um_memory_access_protocol function, the enter_um_memory_access_protocol function adds the specified memory region in the UNMANAGED state to the kernel management region 31, by using the memory allocator 27 (S301). The enter_um_memory_access_protocol function returns the header address of the memory region that is added to the kernel management region 31, to the kernel 32 (S302), and ends the operation. The kernel 32 recognizes the memory region that is added to the kernel management region 31, as a memory region in an unallocated state (that is, the UM_INVALID state).

Figure 36:
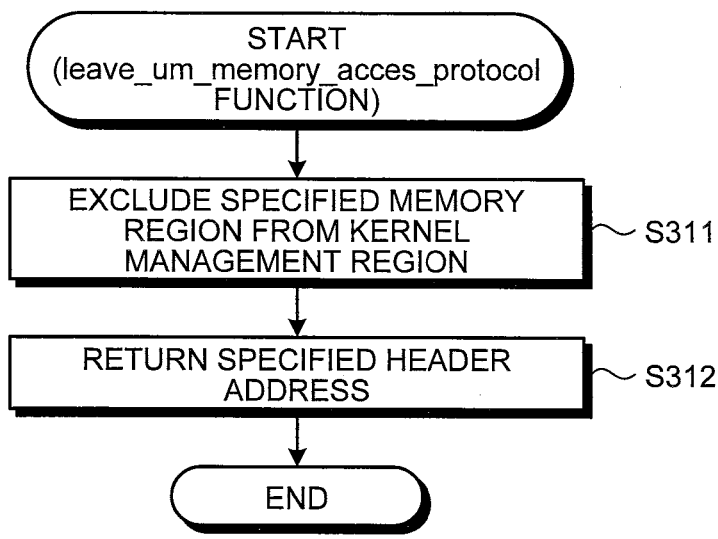
FIG. 36 is a flowchart for explaining operation of leave_um_memory_access_protocol function.

FIG. 36 is a flowchart for explaining the operation of the leave_um_memory_access_protocol function. When the kernel 32 calls the leave_um_memory_access_protocol function, the leave_um_memory_access_protocol function excludes the specified memory region in the UM_INVALID state from the kernel management region 31, by using the memory allocator 27 (S311). The leave_um_memory_access_protocol function returns the header address of the memory region that is excluded from the kernel management region 31, to the kernel 32 (S312), and ends the operation. The memory region that is excluded from the kernel management region 31 becomes the UNMANAGED state, that is, a state that the kernel 32 does not manage.

Figure 37:
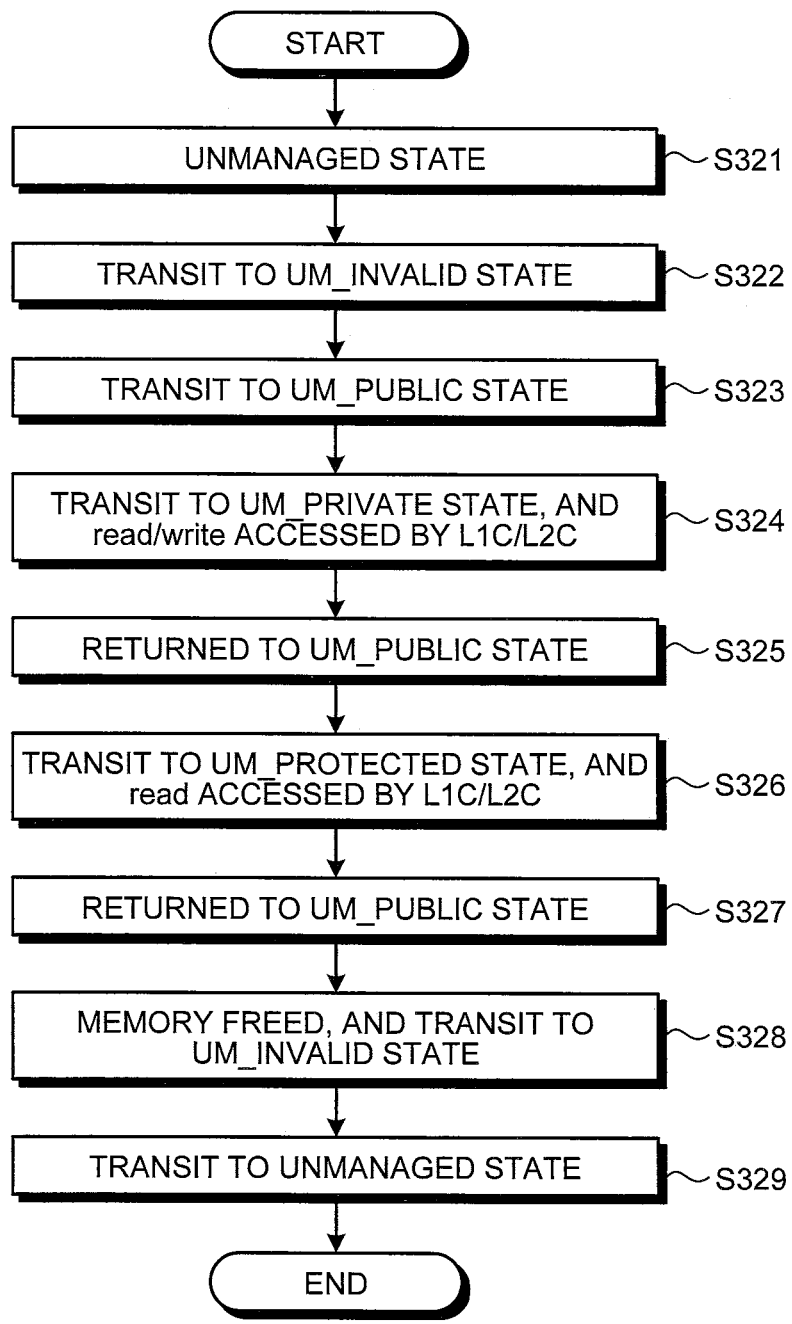
FIG. 37 is a flowchart for explaining an example of a state transition when a memory region is shared within a process.

An example of performing state transitions of a memory region by using the state transition function 26 that operates as described above is explained next. FIG. 37 is a flowchart for explaining an example of state transitions when a memory region is shared within a process.

First, a memory region is in the UNMANAGED state (S321). When the kernel 32 calls the enter_um_memory_access_protocol function, the enter_um_memory_access_protocol function changes this memory region from the UNMANAGED state to the UM_INVALID state (S322). Next, to share data between tasks 29 within a certain process, one task 29 within this process calls the allocate_um_public_memory function, and the allocate_um_public_memory function changes the memory region from the UM_INVALID state to the UM_PUBLIC state (S323). Next, one task 29 within this process calls the open_um_private_memory function, and the open_um_private_memory function changes the memory region to the UM_PRIVATE state, and the task 29 of the caller of the open_um_private_memory function performs a read/write access to this memory region by the L1C/L2C (S324). During this period, other tasks 29 are not permitted to access, and therefore, the access is properly performed.

When the access ends, the task 29 of the caller of the open_um_private_memory function calls the close_um_private_memory function, and the memory region is returned to the UM_PUBLIC state (S325). In this case, cache lines of the L1C 22 corresponding to this memory region is properly written back to the L2C 24, and is then invalidated. An access to memory in the UM_PUBLIC state in this state is prohibited. Thereafter, other task 29 within this process calls the open_um_protected_memory function, and the open_um_protected_memory function changes the memory region to the UM_PROTECTED state, and the task 29 of the caller of the open_um_protected_memory function performs a read access by the L1C/L2C (S326). When the access ends, the task 29 that called the open_um_protected_memory function calls the close_um_protected_memory function, and the memory region is returned to the UM_PUBLIC state (S327). In this case, the cache line of the L1C 22 corresponding to the memory region is properly invalidated.

The task 29 within the same process calls the free_um_public_memory function, and the free_um_public_memory function frees the memory region, and returns the memory region to the UM_INVALID state (S328). The kernel 32 calls the leave_um_memory_access_protocol function, and the memory region becomes the UNMANAGED state (S329), and ends a series of operation.

Figure 38:
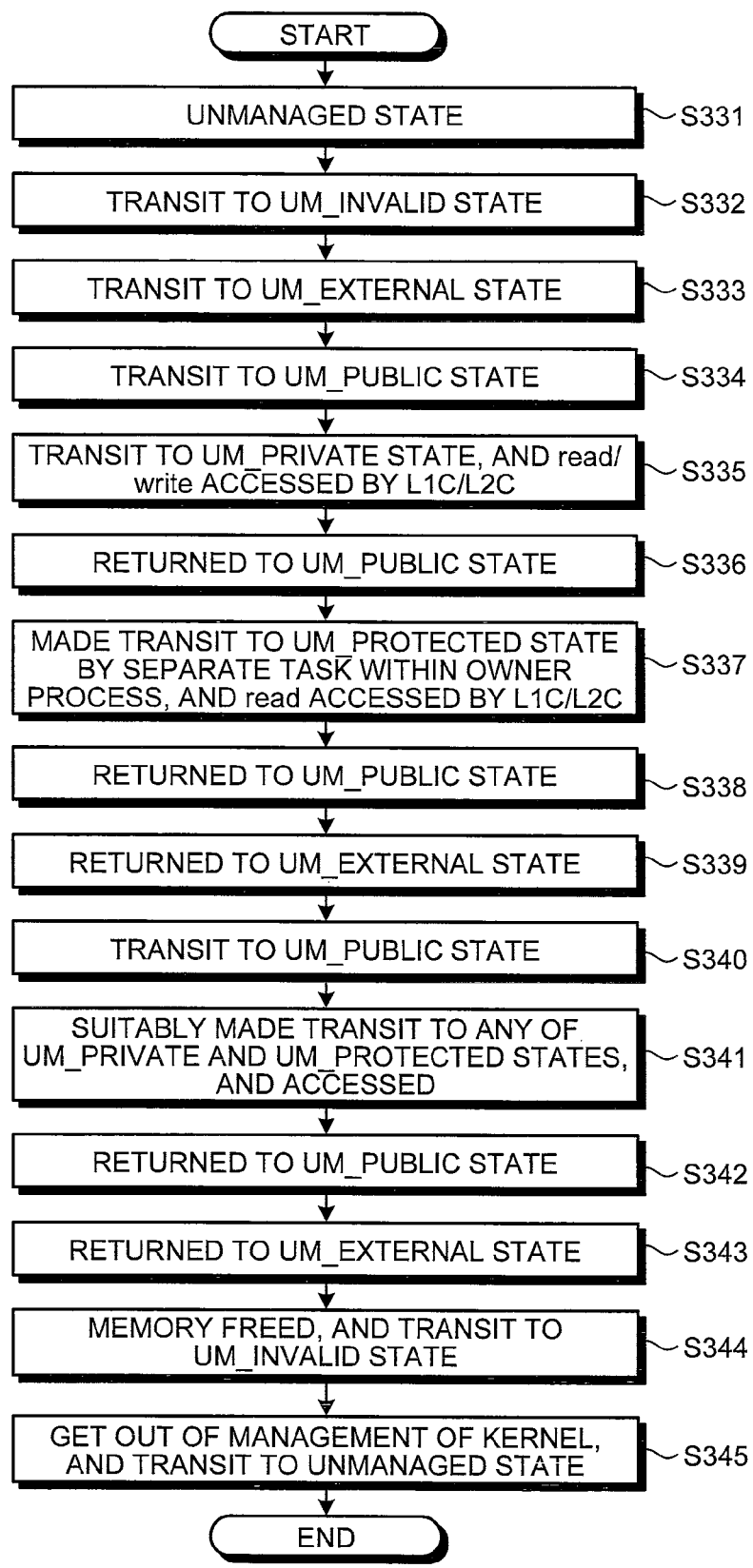
FIG. 38 is a flowchart for explaining an example of a state transition when a memory region is shared between processes.

FIG. 38 is a flowchart for explaining an example of state transitions when a memory region is shared between processes. First, a memory region is in the UNMANAGED state (S331). When the kernel 32 calls the enter_um_memory_access_protocol function, the enter_um_memory_access_protocol function changes this memory region from the UNMANAGED state to the UM_INVALID state (S332). Next, a certain task 29 calls the allocate_um_external_memory function to share data between processes, and the allocate_um_external_memory function invalidates a cache line corresponding to the L2C 24, and changes the memory region from the UM_INVALID state to the UM_EXTERNAL state (S333). In this state, any task in any process is prohibited to access.

Thereafter, one task 29 in a certain process calls the open_um_public_memory function to exclusively use for a shared purpose within this process, and the open_um_public_memory function changes the memory region to the UM_PUBLIC state (S334). In this state, all tasks within this process are prohibited to access yet. Thereafter, one task 29 within this process calls the open_um_private_memory function to exclusively use this memory region, and the open_um_private_memory function changes the memory region to the UM_PRIVATE state (S335). In this state, only the task 29 of the caller of the open_um_private_memory function is permitted to perform a read/write access by the L1C/L2C virtual address. After ending the access, the task 29 of the caller of the open_um_private_memory function calls the close_um_private_memory function, and the close_um_private_memory function returns the memory region to the UM_PUBLIC state (S336). In this case, the cache lines of the L1C 22 corresponding to this memory region are properly written back to the L2C 24, and is then invalidated.

Thereafter, one task 29 within this process calls the open_um_protected_memory function, and the open_um_protected_memory function changes the memory region to the UM_PROTECTED state, and the task 29 of the caller of the open_um_protected_memory function performs a read access by the L1C/L2C (S337). When the access ends, the task 29 of the caller of the open_um_protected_memory function calls the close_um_protected_memory function, and returns the memory region to the UM_PUBLIC state (S338). In this case, the cache lines of the L1C 22 corresponding to this memory region is properly invalidated.

Thereafter, when the exclusive use by the process ends, one task 29 within this process calls the close_um_public_memory function, and the close_um_public_memory function returns the memory region to the UM_EXTERNAL state (S339). In this case, the cache line of the L2C 24 corresponding to this memory region is properly written back to the memory 3, and is then invalidated.

Next, for another process to access this memory region, any task 29 within this process calls the open_um_public_memory function, and the open_um_public_memory function changes this memory region to the UM_PUBLIC state (S340). However, because an address that indicates a memory in the UM_EXTERNAL state is different for each process, this relationship needs to be managed separately. Thereafter, the task 29 within this process performs a necessary access to this memory region, after suitably making transition of this memory region to the UM_PRIVATE state or the UM_PROTECTED state (S341). After ending the process, the task 29 returns the memory region to the UM_PUBLIC state (S342). After the access in the process ends, one task 29 within this process calls the close_um_public_memory function, and the close_um_public_memory function returns this memory region to the UM_EXTERNAL state (S343). When any task 29 calls the free_um_external_memory function, the free_um_external_memory function frees the memory, and returns this memory region to the UM_INVALID state (S334). When the kernel 32 calls the leave_um_memory_access_protocol function, the leave_um_memory_access_protocol function sets the memory region to the UNMANAGED state (S345), and ends the operation.

As explained above, according to the second embodiment, the memory region includes the kernel unit that permits the UM_PRIVATE state in which the L1C/L2C is allowed to read/write by access, and one task 29 is given the exclusive right of use, the UM_PUBLIC state in which read/write is prohibited, and one process is given the exclusive right of use, and the UM_EXTERNAL state in which read/write is prohibited, and all tasks 29 (that is, all processes) are given the right of use, and that performs a transition between the UM_PRIVATE state and the UM_PUBLIC state and between the UM_PUBLIC state and the UM_EXTERNAL state. The kernel unit is configured to write back the corresponding L1C 22 to the L2C 24 when making transition of a memory region from the UM_PRIVATE state to the UM_PUBLIC state, and write back the corresponding L2C 24 to the memory region when making transition of a memory region from the UM_PUBLIC state to the UM_EXTERNAL state. Therefore, in the multicore processor system that includes the multicore processor in which plural cores each including a first cache form a cluster by sharing a second cache, the multicore processor system can share the memory region of the memory 3 between the tasks 29, between the processes, and between the clusters, while holding consistency of the storage content of the first cache, the second cache, and the memory 3, even in the memory 3 that does not have a shadow region.

Further, because the kernel unit performs a transition between the UM_PRIVATE state, the UM_PUBLIC state, the UM_EXTERNAL state, and the UM_INVALID state that is not allocated to any core 21, the kernel unit can allocate a memory region to a specific task 29, a specific process, or whole processes.

Further, because the kernel unit performs a transition between the UM_PUBLIC state and the UM_PROTECTED state in which the L1C/L2C is permitted to perform a read only access and in which one or more tasks 29 that request belonging to the same process are given the right of use, the kernel unit can read the memory from one task at a high speed.

The second embodiment can be also applied to a multicore processor system having the memory 3 that includes both a memory region which includes a shadow region and a memory region which does not include a shadow region, by adding the functions (1) to (14) explained in the first embodiment to the state transition function 26.

The second embodiment can be also applied to a multicore processor that includes only one cluster 25 which includes plural cores 21, not only to the multicore processor 2 having plural clusters 25 each cluster including plural cores 21.

In the memory access protocol explained in the second embodiment, a task within any process is prohibited to access a memory that is used to be shared between processes, in the UM_EXTERNAL state. For a task to be able to access the memory, a task within any process needs to change a memory region to the UM_PRIVATE state or to the UM_PROTECTED state via the UM_PUBLIC state. During this period, none of tasks within other processes are permitted to access. This becomes a strict constraint that when there is read only data to be referred to in common by processes, this read only data cannot be referred to simultaneously from plural processes. In a third embodiment, to mitigate this constraint, more states are added to the MAP according to the second embodiment.

A configuration of a multicore processor system according to the third embodiment is equal to that of the second embodiment, except the content of functions that are included in the state transition function 26, and therefore, a redundant explanation of the configuration excluding the functions included in the state transition function 26 is omitted.

Figure 39:
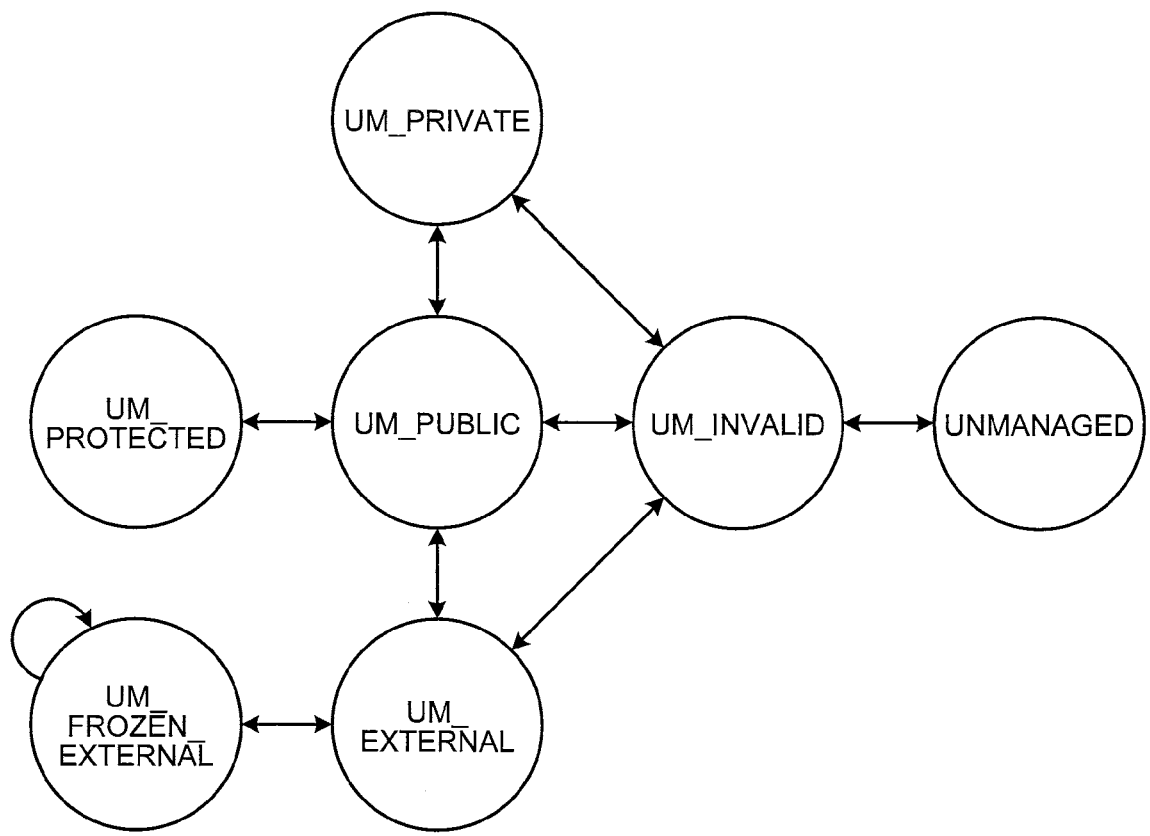
FIG. 39 is an explanatory diagram of a MAP according to a third embodiment.

FIG. 39 is an explanatory diagram of a MAP according to the third embodiment. The MAP according to the third embodiment has the following UM_FROZEN_EXTERNAL state added to the MAP according to the second embodiment explained in (g) to (l).

(m) The UM_FROZEN_EXTERNAL state

In this state, a memory region can be changed from the UM_EXTERNAL state, and a task within a certain process can perform a read only access. Other process is permitted to redundantly change a memory region that a certain process has changed to the UM_FROZEN_EXTERNAL state, to the UM_FROZEN_EXTERNAL state. A memory region that plural processes have set to this state remains in this UM_FROZEN_EXTERNAL state until when all of these processes return the memory region to the UM_EXTERNAL state.

The state transition function 26 according to the third embodiment includes the following two functions, in addition to the functions explained in (15) to (28).

(29) freeze_um_external_memory (void *addr, size_t size)

This is a function that enables the caller task 29 or the task 29 that belongs to the same process as that of this caller task 29 to use a memory region in the UM_EXTERNAL state or the UM_FROZEN_EXTERNAL that is specified by the header address "addr" and the argument "size", as a memory region in the UM_FROZEN_EXTERNAL state.

(30) melt_um_frozen_external_memory (void *addr, size_t size)

This is a function that returns a memory region that is used in the UM_FROZEN_EXTERNAL state that is specified by the header address "addr" and the argument "size", from the UM_FROZEN_EXTERNAL state to the UM_EXTERNAL state. When plural processes are present that use a memory region in the UM_FROZEN_EXTERNAL state, when this function is called from all of these plural processes, this function returns the memory region from the UM_FROZEN_EXTERNAL state to the UM_EXTERNAL state.

In the third embodiment, the task 29 and the kernel 32 can recognize a memory region that is in the UM_FROZEN_EXTERNAL state and a number of processes that use this memory region as a memory region in the UM_FROZEN_EXTERNAL state. For example, in the memory 3, a table is prepared that relates between information (for example, the header physical address and the size) that specifies a memory region in the UM_FROZEN_EXTERNAL state and a list of identifiers of processes that are using this memory region as a memory region in the UM_FROZEN_EXTERNAL state. The task 29 and the kernel 32 refer to this table.

Operation of each function that is included in the state transition function 26 in the third embodiment is explained next. Because the operation of each function explained in (15) to (28) is the same as that of the second embodiment, their explanation is omitted, and only the operations of the freeze_um_external_memory function and the melt_um_frozen_external_memory function are explained.

Figure 40:
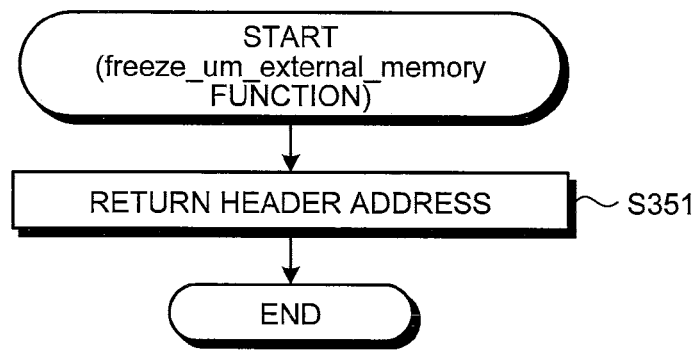
FIG. 40 is a flowchart for explaining operation of freeze_um_external_memory function.

FIG. 40 is a flowchart for explaining the operation of the freeze_um_external_memory function. When the task 29 calls the freeze_um_external_memory function, the freeze_um_external_memory function returns the header address of the specified memory region (S351), and ends the operation. The task 29 of the caller of the freeze_um_external_memory function and other tasks 29 that belong to the same process as that of this task 29 can use a memory region that is assigned by the address returned at S351 and the argument "size", as a memory region in the UM_FROZEN_EXTERNAL state.

Figure 41:
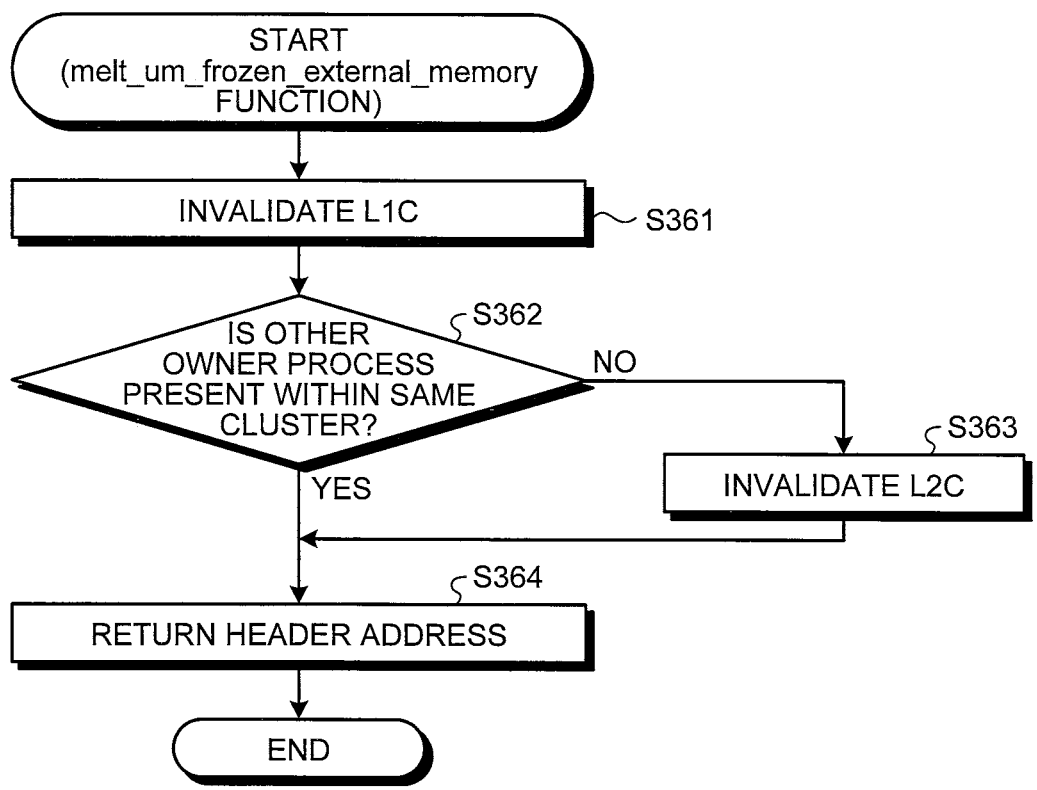
FIG. 41 is a flowchart for explaining operation of melt_um_frozen_external_memory function.

FIG. 41 is a flowchart for explaining the operation of the melt_um_frozen_external_memory function. When the task 29 calls the melt_um_frozen_external_memory function, the melt_um_frozen_external_memory function invalidates cache lines of the L1C 22 of the cores 21 which belong to the process on which the content of the assigned memory region resides, by using the cache/memory management unit 28 (S361). The melt_um_frozen_external_memory function determines whether other process within the same cluster 25 is using the assigned memory region (S362). When a process that is using this memory region is not present within the same cluster 25 (No at S362), the melt_um_frozen_external_memory function invalidates cache lines of the L2C 24 on which the content of the assigned memory region resides, by using the cache/memory management unit 28 (S363), returns the header address of the specified memory region (S364), and ends the operation. When there is a process that is using the memory region within the same cluster 25 (Yes at S362), operation of S363 is skipped. When there is no remaining process that is using the memory region, that is specified by the address returned at S363 and the argument "size", as a memory region in the UM_FROZEN_EXTERNAL state, all tasks 29 can recognize this memory region as a memory region in the UM_EXTERNAL state.

Figure 42:
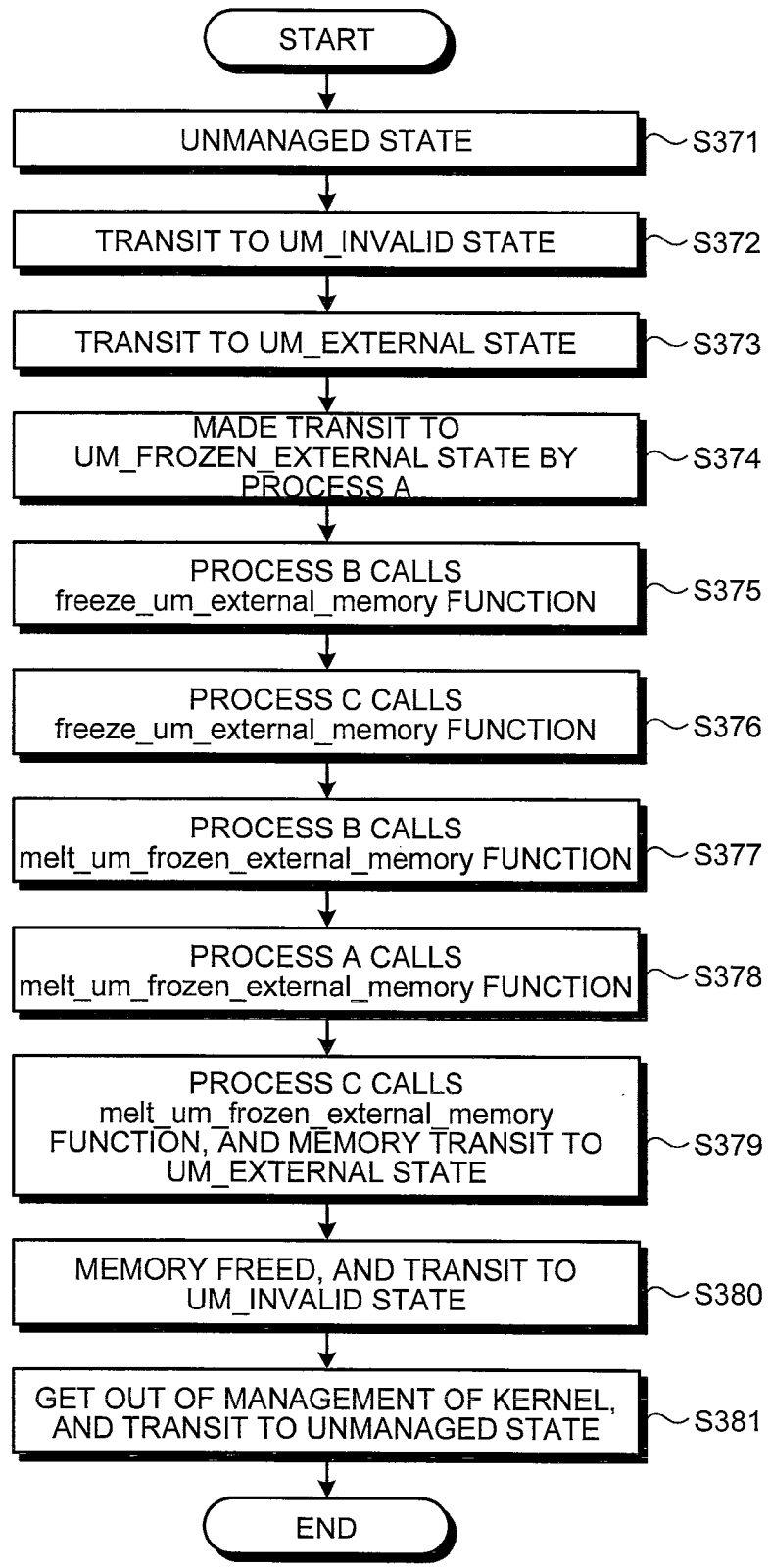
FIG. 42 is a flowchart for explaining an example of a state transition to perform a read only access from plural processes.

An example of performing state transitions of a memory region by using the state transition function 26 that operates as described above is explained next. FIG. 42 is a flowchart for explaining an example of a state transition to perform a read only access from plural processes.

Processes that are the same as those at S331 to S333 in FIG. 38 are performed at S371 to S373 in FIG. 42. When the task 29 that belongs to a certain process (a process A) calls the freeze_um_external_memory function by specifying the memory region in the UM_EXTERNAL state, the freeze_um_external_memory function sets the assigned memory region to the UM_FROZEN_EXTERNAL state, and permits all tasks 29 that belong to the process A to perform a read only access to the memory region (S374). When the task 29 that belongs to a process B that is different from the process A calls the freeze_um_external_memory function by specifying the memory region, the freeze_um_external_memory function permits all tasks 29 that belong to the process A and the process B to perform a read only access to the memory region (S375). A virtual address for specifying this memory region is different for each process. Therefore, a relationship of the virtual address for each process needs to be separately managed.

When the task 29 that belongs to a process C that is different from the process A and the process B calls the freeze_um_external_memory function by specifying the memory region, the freeze_um_external_memory function permits all tasks 29 that belong to the process A, the process B, and the process C to perform a read only access to the memory region (S376).

Thereafter, after the process B ends the access, when the task 29 that belongs to the process B calls the melt_um_frozen_external_memory function, the melt_um_frozen_external_memory function prohibits all tasks 29 that belong to the process B to access the memory region (S377). In this case, the melt_um_frozen_external_memory function invalidates the corresponding cache line from the L1C 22 of the cores 21 that belong to the process B. When the process A and the process C belong to the cluster 25 that is different from that of the process B, the L2C 24 is also invalidated. At this time, in addition to the process B, there is a process that is using the memory region in the UM_FROZEN_EXTERNAL state. Therefore, even after the process at S377, the memory region is still recognized as a memory region in the UM_FROZEN_EXTERNAL state.

Thereafter, after the process A ends the access, when the task 29 that belongs to the process A calls the melt_um_frozen_external_memory function, the melt_um_frozen_external_memory function prohibits all tasks 29 that belong to the process A to access the memory region (S378). In this case, the melt_um_frozen_external_memory function invalidates the corresponding cache lines from the L1C 22 of the cores 21 that belong to the process A. When the process C belongs to the cluster 25 that is different from that of the process B, the L2C 24 is also invalidated. At this time, in addition to the process A, there is a process that is using the memory region in the UM_FROZEN_EXTERNAL state. Therefore, even after the process at S378, the memory region is still recognized as a memory region in the UM_FROZEN_EXTERNAL state.

Thereafter, after the process C ends the access, when the task 29 that belongs to the process C calls the melt_um_frozen_external_memory function, the melt_um_frozen_external_memory function prohibits all tasks 29 that belong to the process C to access the memory region. Because there is no other process that is using the memory region in the UM_FROZEN_EXTERNAL state, this memory region is returned to the UM_EXTERNAL state (S379). In this case, the melt_um_frozen_external_memory function invalidates the corresponding cache line from the L1C 22 of the cores 21 that belong to the process C and the L2C 24 of the cluster 25 to which the process C belongs.

Thereafter, processes that are the same as those at S344 and S345 are performed at S380 and S381, and a series of process ends.

As explained above, according to the third embodiment, because the UM_FROZEN_EXTERNAL state in which the L1C/L2C is permitted to perform a read only access to requested one or more processes is added to the MAP, plural processes can simultaneously read the memory region that has no shadow region, by using a cache. Therefore, a data exchange between the processes becomes simple. Also, a data exchange within a single process becomes simple.

According to the third embodiment, the UM_FROZEN_EXTERNAL state is added to the MAP according to the second embodiment. Meanwhile, a MAP according to a fourth embodiment is configured to have similar states added to the MAP of the first embodiment.

A configuration of a multicore processor system according to the fourth embodiment is equal to that of the first embodiment, except the content of functions that are included in the state transition function 26, and therefore, a redundant explanation of the configuration excluding the functions included in the state transition function 26 is omitted.

Figure 43:
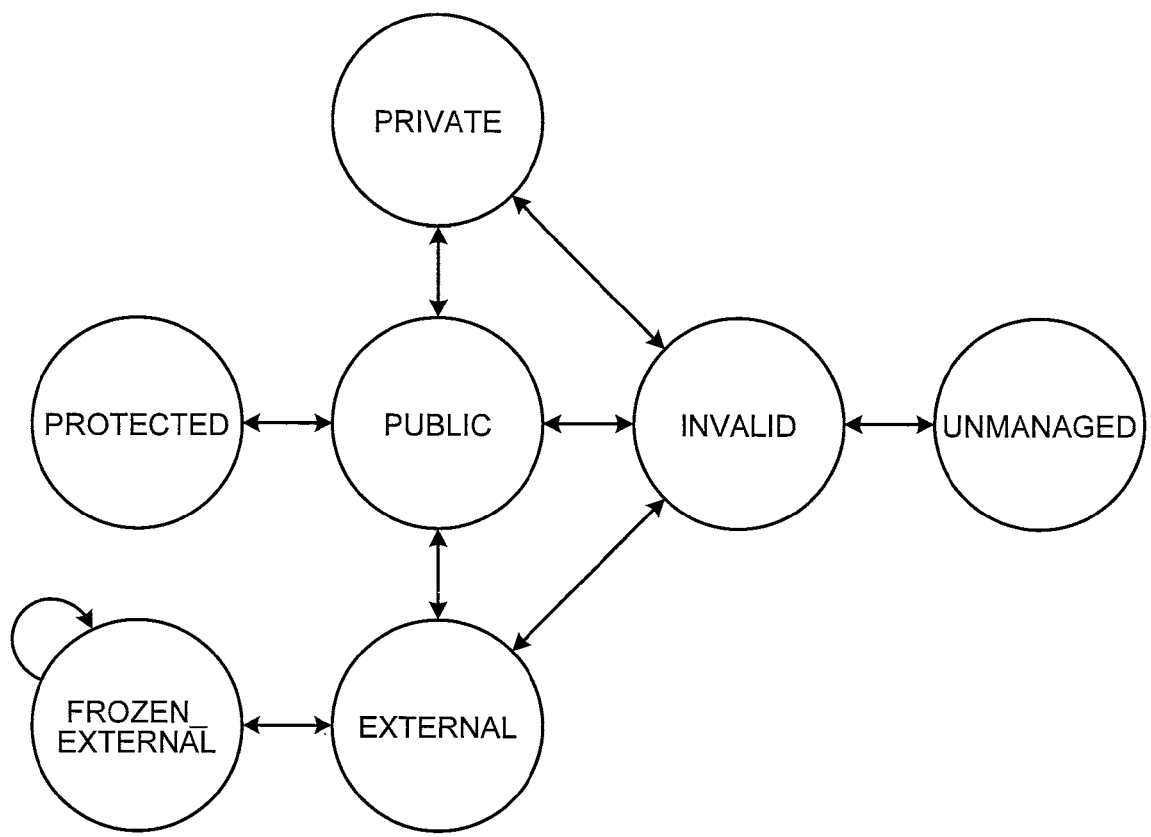
FIG. 43 is an explanatory diagram of a MAP according to a fourth embodiment.

FIG. 43 is an explanatory diagram of the MAP according to the fourth embodiment. The MAP according to the fourth embodiment has the following state added to the MAP according to the first embodiment explained in (a) to (f).

(n) The FROZEN_EXTERNAL state

In this state, a memory region can be changed from the EXTERNAL state, and a task within a certain process can perform a read only access by the L1C/L2C. Other process is also permitted to redundantly change a memory region that a certain process has changed to the FROZEN_EXTERNAL state, to the FROZEN_EXTERNAL state. A memory region that plural processes have set to this state remains in this FROZEN_EXTERNAL state until when all of these processes return the memory region to the EXTERNAL state.

The state transition function 26 according to the fourth embodiment further includes the following two functions, in addition to the functions explained in (1) to (14).

(31) freeze_external_memory (void *addr, size_t size)

This is a function that enables the caller task 29 or the task 29 that belongs to the same process as that of this caller task 29 to use a memory region in the EXTERNAL state or the FROZEN_EXTERNAL state that is specified by the header address "addr" and the argument "size", as a memory region in the FROZEN_EXTERNAL state.

(32) melt_frozen_external_memory (void *addr, size_t size)

This is a function that returns a memory region that is used in the FROZEN_EXTERNAL state that is specified by the header address "addr" and the argument "size", from the FROZEN_EXTERNAL state to the EXTERNAL state.

When plural processes are present that use a memory region in the FROZEN_EXTERNAL state, when this function is called from all of these plural processes, this function returns the memory region from the FROZEN_EXTERNAL state to the EXTERNAL state.

In the fourth embodiment, the task 29 and the kernel 32 can also recognize a memory region that is in the FROZEN_EXTERNAL state and a number of processes that use this memory region as a memory region in the FROZEN_EXTERNAL state.

Operation of each function that is included in the state transition function 26 in the fourth embodiment is explained next. Only the operations of the freeze_external_memory function and the melt_frozen_external_memory function are explained here.

Figure 44:
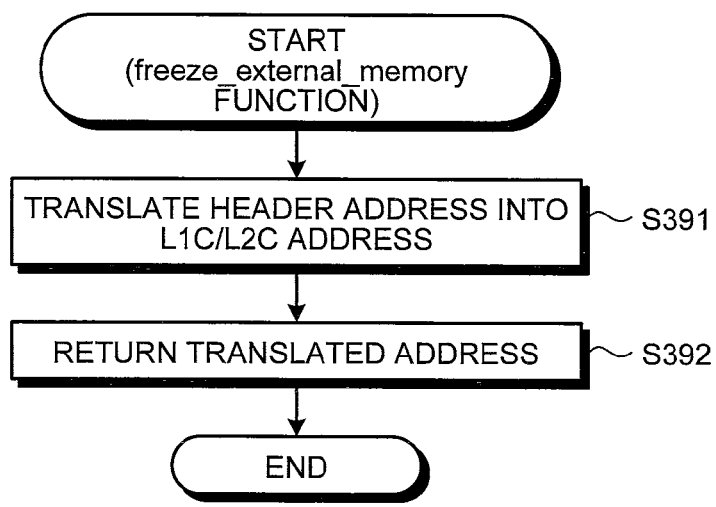
FIG. 44 is a flowchart for explaining operation of freeze_external_memory function.

FIG. 44 is a flowchart for explaining the operation of the freeze_external_memory function. When the task 29 calls the freeze_external_memory function, the freeze_external_memory function translates the specified L1UC/L2UC virtual address into the corresponding L1C/L2C virtual address (S391). The freeze_external_memory function returns the translated address (S392), and ends the operation. The task 29 of the caller of the freeze_external_memory function and other tasks 29 that belong to the same process as that of this caller task 29 can use the memory region that is specified by the address returned at S392 and the argument "size", as a memory region in the FROZEN_EXTERNAL state.

Figure 45:
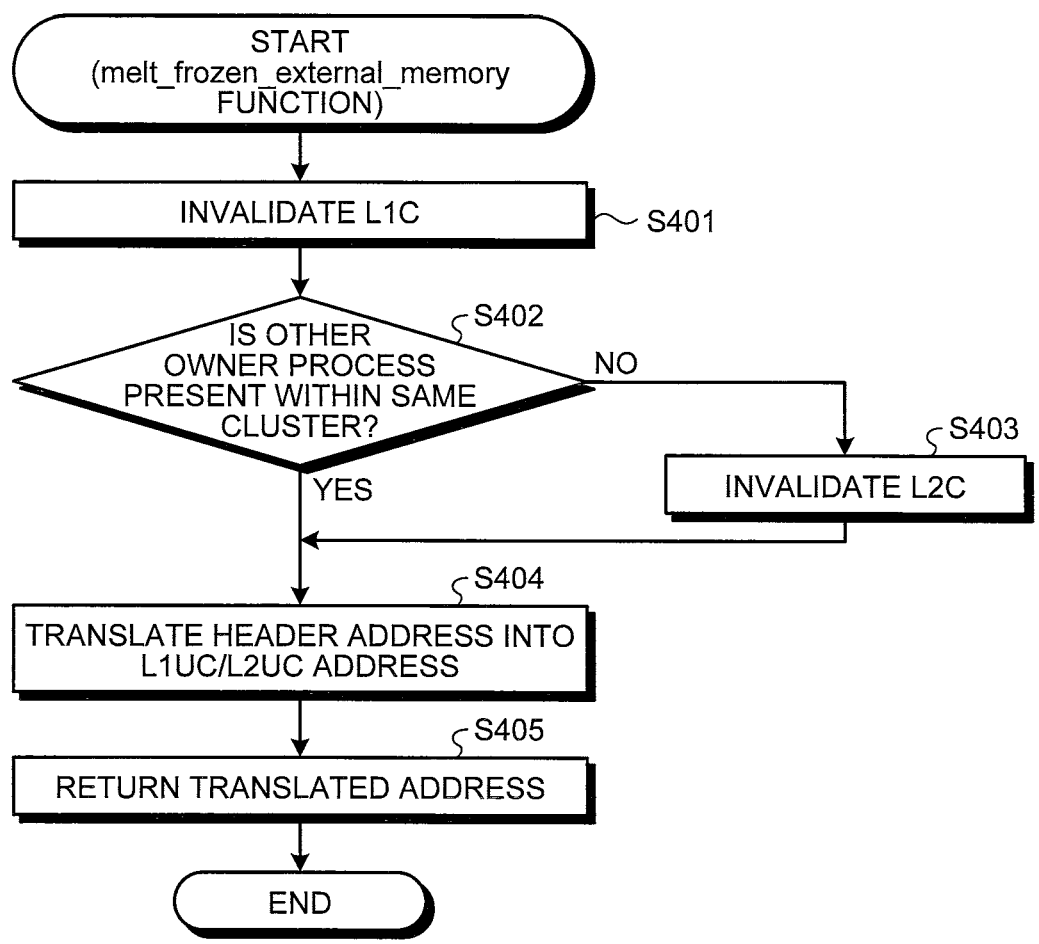
FIG. 45 is a flowchart for explaining operation of melt_frozen_external_memory function.

FIG. 45 is a flowchart for explaining the operation of the melt_frozen_external_memory function. When the task 29 calls the melt_frozen_external_memory function, the melt_frozen_external_memory function invalidates cache lines of the L1C 24 of the cores which belong to the process on which the content of the specified memory region resides, by using the cache/memory management unit 28 (S401). The melt_frozen_external_memory function determines whether other process within the same cluster 25 is using the specified memory region (S402). When a process that is using this memory region is not present within the same cluster 25 (No at S402), the melt_frozen_external_memory function invalidates cache lines of the L2C 24 on which the content of the specified memory region resides, by using the cache/memory management unit 28 (S403). The melt_frozen_external_memory function translates the header address (L1C/L2C virtual address) of the assigned memory region into the corresponding L1UC/L2UC virtual address (S404), returns the translated address (S405), and ends the operation. When there is a process that is using the memory region within the same cluster 25 (Yes at S402), operation of S403 is skipped. When there is no remaining process that is using the memory region that is specified by the address returned at S405 and the argument "size", as a memory region in the FROZEN_EXTERNAL state, all tasks 29 can recognize this memory region as a memory region in the EXTERNAL state.

Figure 46:
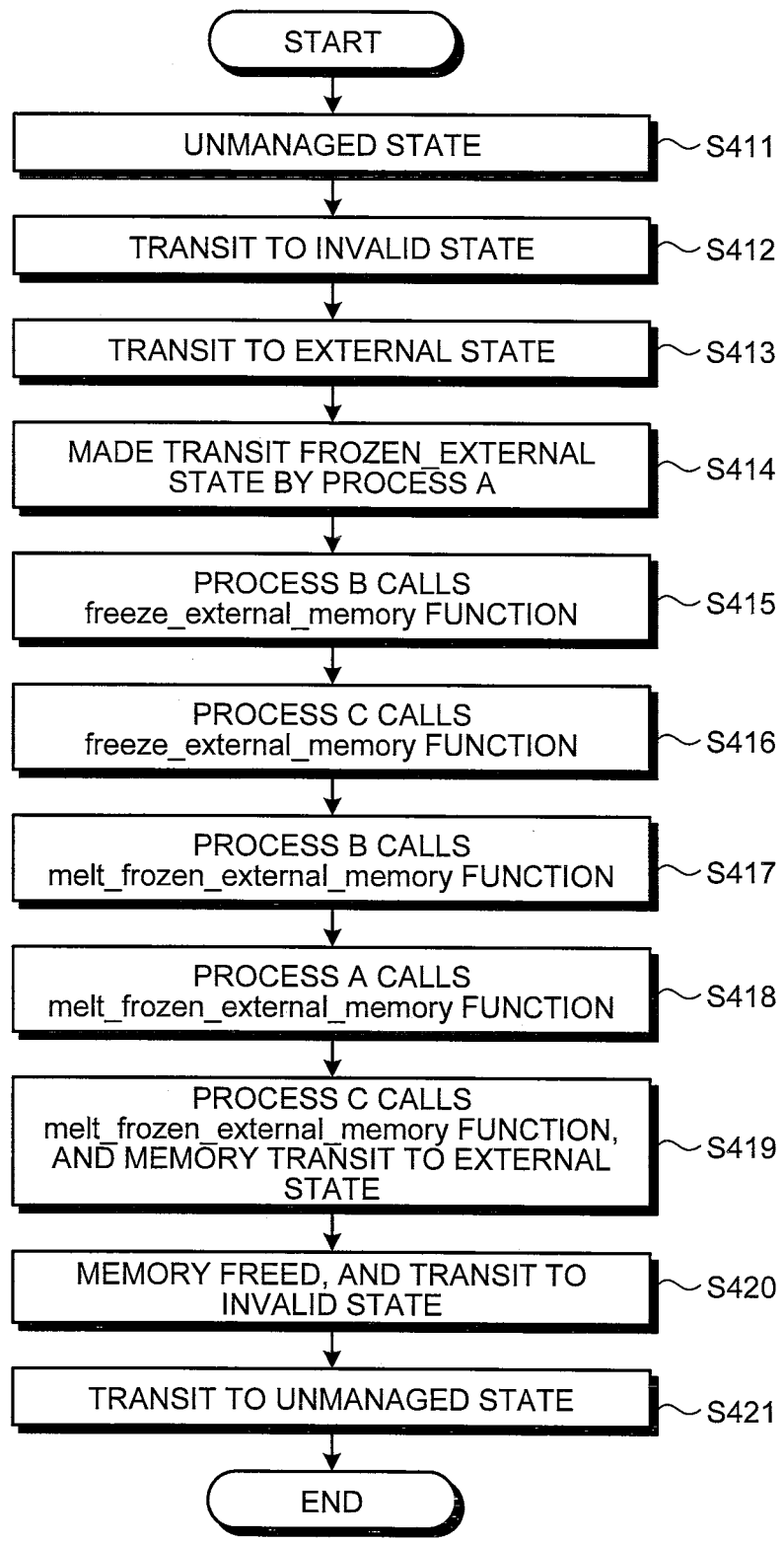
FIG. 46 is a flowchart for explaining an example of a state transition to perform a read only access from plural processes.

An example of performing state transitions of a memory region by using the state transition function 26 that operates as described above is explained next. FIG. 46 is a flowchart for explaining an example of a state transition to perform a read only access from plural processes.

First, a memory region is in the UNMANAGED state (S411). When the kernel 32 calls the enter_memory_access_protocol function, the enter_memory_access_protocol function changes this memory region from the UNMANAGED state to the INVALID state (S412). Next, to share data between processes, a certain task 29 calls the allocate_external_memory function, and the allocate_external_memory function changes the memory region from the INVALID state to the EXTERNAL state, after invalidating the corresponding cache line of the L2C 24 (S413). In this state, any task in any process is permitted to access the L1UC/L2UC.

When the task 29 that belongs to a certain process (the process A) calls the freeze_external_memory function by specifying the memory region in the EXTERNAL state, the freeze_external_memory function changes the assigned memory region to the FROZEN_EXTERNAL state, and permits all tasks 29 that belong to the process A to perform a read only access to the memory region by the L1C/L2C (S414). Tasks 29 that belong to a process other than the process A are permitted to perform a read only access by the L1UC/L2UC.

When the task 29 that belongs to the process B that is different from the process A calls the freeze_external_memory function by specifying the memory region, the freeze_external_memory function permits all tasks 29 that belong to the process A and the process B to perform a read only access to the memory region by the L1C/L2C (S415). A virtual address for specifying this memory region is different for each process. Therefore, a relationship of the virtual address for each process needs to be separately managed.

When the task 29 that belongs to the process C that is different from the process A and the process B calls the freeze_external_memory function by assigning the memory region, the freeze_external_memory function permits all tasks 29 that belong to the process A, the process B, and the process C to perform a read only access to the memory region by the L1C/L2C (S416).

Thereafter, after the process B ends the access, when a task 29 that belongs to the process B calls the melt_frozen_external_memory function, the melt_frozen_external_memory function prohibits all tasks 29 that belong to the process B to access the memory region by the L1C/L2C and permits the L1UC/L2UC to perform a read only access this memory region (S417). In this case, the melt_frozen_external_memory function invalidates the corresponding cache lines of the L1C 22 of the cores 21 that belong to the process B. When the process A and the process C belong to the cluster 25 that is different from that of the process B, the L2C 24 is also invalidated. At this time, in addition to the process B, there is a process that is using the memory region in the FROZEN_EXTERNAL state. Therefore, even after the process at S417, the memory region is still recognized as a memory region in the FROZEN_EXTERNAL state.

Thereafter, after the process A ends the access, when a task 29 that belongs to the process A calls the melt_frozen_external_memory function, the melt_frozen_external_memory function prohibits all tasks 29 that belong to the process A to access the memory region by the L1C/L2C, and permits the L1UC/L2UC to perform a read only access this memory region (S418). In this case, the melt_frozen_external_memory function invalidates the corresponding cache lines of the L1C 22 of the cores 21 that belong to the process A. When the process C belongs to the cluster 25 that is different from that of the process B, the L2C 24 is also invalidated. At this time, in addition to the process A, there is a process that is using the memory region in the FROZEN_EXTERNAL state. Therefore, even after the process at S418, the memory region is still recognized as a memory region in the FROZEN_EXTERNAL state.

Thereafter, after the process C ends the access, when a task 29 that belongs to the process C calls the melt_frozen_external_memory function, the melt_frozen_external_memory function prohibits all tasks 29 that belong to the process C to access the memory region by the L1C/L2C. Because there is no other process that is using the memory region in the UM_FROZEN_EXTERNAL state, this memory region is returned to the EXTERNAL state (S419). That is, all tasks 29 are permitted to perform a read/write access to the memory region by the L1UC/L2UC. In this case, the melt_frozen_external_memory function invalidates the corresponding cache lines of the L1C 22 of the cores 21 that belongs to the process C and the L2C 24 of the cluster 25 to which the process C belongs.

Thereafter, processes that are the same as those at S172 and S173 are performed at S420 and S421, and a series of process ends.

As explained above, according to the fourth embodiment, because the FROZEN_EXTERNAL state in which the L1C/L2C is permitted to perform a read only access to requested one or more processes is added to the MAP, plural processes can simultaneously read the memory region by using the L1C/L2C. Therefore, a data exchange between the processes can be performed at a high speed. Also, a data exchange within a single process can be performed at a high speed.

According to a fifth embodiment, a MAP is configured such that the MAP in the first embodiment additionally has the FROZEN_PUBLIC state to which a memory region can be changed from the PUBLIC state and in which tasks that belong to the same process can perform a read access.

A configuration of a multicore processor system according to the fifth embodiment is equal to that of the first embodiment, except the content of functions that are included in the state transition function 26, and therefore, a redundant explanation of the configuration excluding the functions included in the state transition function 26 is omitted.

Figure 47:
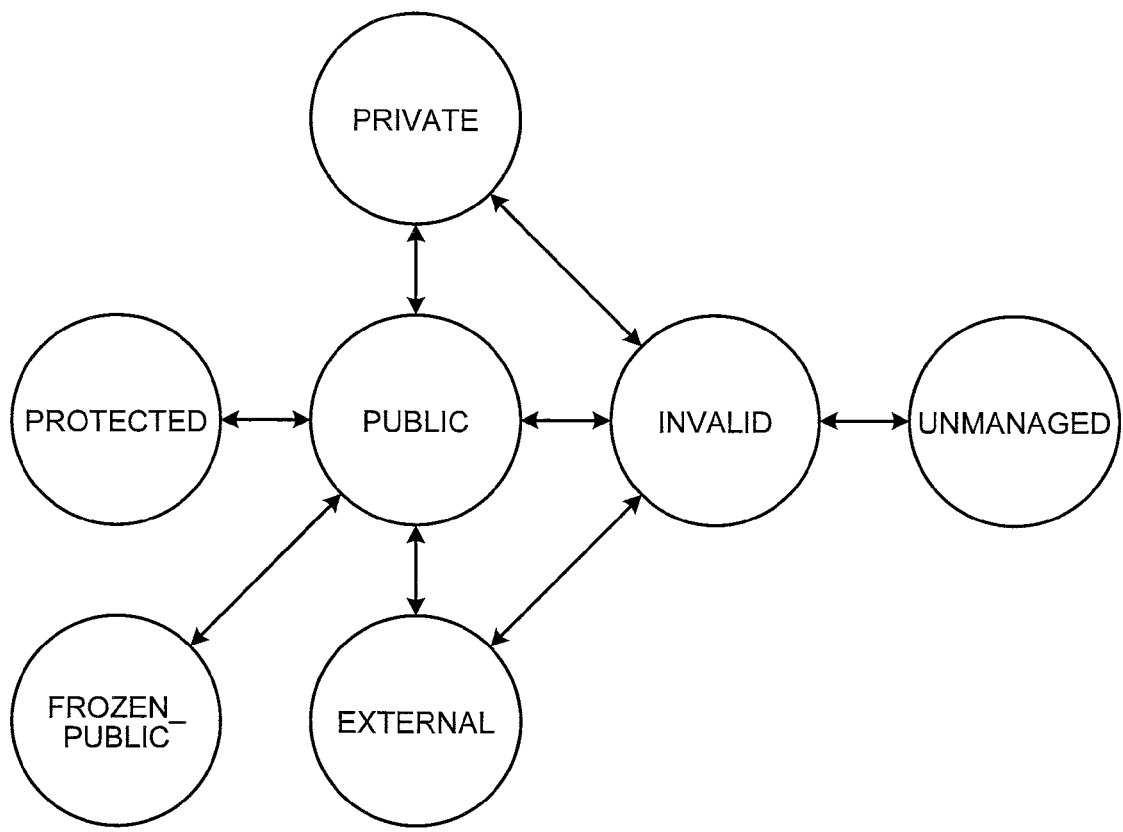
FIG. 47 is an explanatory diagram of a MAP according to a fifth embodiment.

FIG. 47 is an explanatory diagram of the MAP according to the fifth embodiment. The MAP according to the fifth embodiment has the following FROZEN_PUBLIC state added to the MAP according to the first embodiment explained in (a) to (f).

(o) The FROZEN_PUBLIC state

In this state, a memory region can be changed from the PUBLIC state, and all tasks 29 within the same process can perform a read only access by the L1C/L2C.

The state transition function 26 according to the fifth embodiment further includes the following two functions, in addition to the functions explained in (1) to (14).

(33) freeze_public_memory (void *addr, size_t size)

This is a function that changes a memory region that is specified by the header address "addr" and the argument "size", from the PUBLIC state to the FROZEN_PUBLIC state. Only a task 29 that belongs to the process that is permitted to access in the PUBLIC state can call this function.

(34) melt_frozen_public_memory (void *addr, size_t size)

This is a function that changes a memory region that is specified by the header address "addr" and the argument "size", from the FROZEN_PUBLIC state to the PUBLIC state.

Operation of each function that is included in the state transition function 26 in the fifth embodiment is explained next. Only the operations of the freeze_public_memory function and the melt_frozen_public_memory function are explained here.

Figure 48:
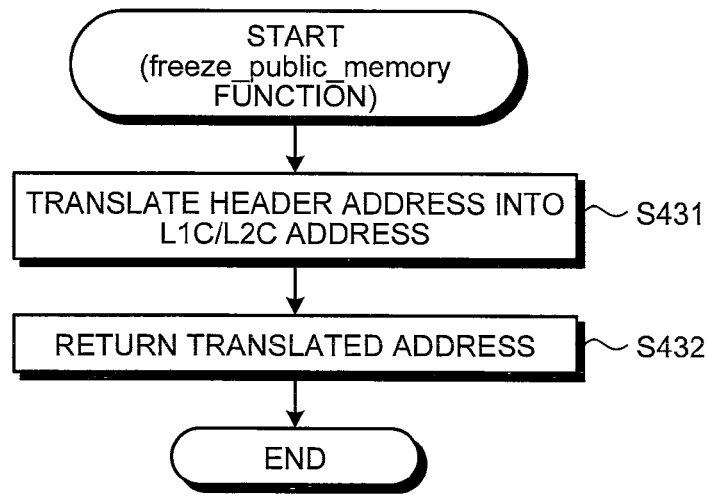
FIG. 48 is a flowchart for explaining operation of freeze_public_memory function.

FIG. 48 is a flowchart for explaining the operation of the freeze_public_memory function. When the task 29 that belongs to the process that is permitted to perform a read/write access by the L1UC/L2UC to a memory region in the PUBLIC state calls the freeze_public_memory function, by specifying this memory region in the PUBLIC state, the freeze_public_memory function translates the header address (the L1UC/L2UC virtual address) of the specified memory region into the corresponding L1C/L2C virtual address (S431). The freeze_public_memory function returns the translated address (S432), and ends the operation. The task 29 of the caller of the freeze_public_memory function and other tasks 29 that belong to the same process as that of this caller task 29 can use the memory region that is specified by the address returned at S432 and the argument "size", as a memory region in the FROZEN_PUBLIC state.

Figure 49:
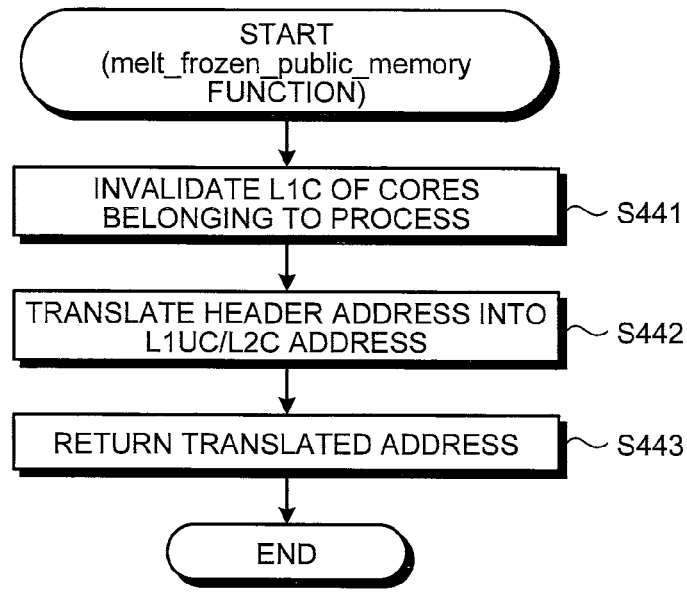
FIG. 49 is a flowchart for explaining operation of melt_frozen_public_memory function.

FIG. 49 is a flowchart for explaining the operation of the melt_frozen_public_memory function. When the task 29 calls the melt_frozen_public_memory function, the melt_frozen_public_memory function invalidates cache lines of the L1C 22 of cores of the process to which the task 29 belongs, on which the content of the assigned memory region resides, by using the cache/memory management unit 28 (S441). The melt_frozen_public_memory function translates the header address (the L1C/L2C virtual address) of the specified memory region into the corresponding L1UC/L2UC virtual address (S442), returns the translated address (S443), and ends the operation. The task 29 of the caller of the function and other tasks 29 that belong to the same process as that of this caller task 29 can use the memory region that is assigned by the address returned at S443 and the argument "size", as a memory region in the PUBLIC state.

As explained above, according to the fifth embodiment, because the FROZEN_PUBLIC state in which the tasks that belong to the same process are permitted to perform a read only access by the L1C/L2C is added to the MAP, plural tasks that belong to the same process can simultaneously read by using the L1C and the L2C. Therefore, the tasks can exchange data within the process at a high speed.

Further, because a memory region can be directly changed from the PUBLIC state to the FROZEN_PUBLIC state without via the EXTERNAL state, when data is desired to be shared within the same process, data can be shared more simply than in the fourth embodiment.

According to a sixth embodiment, a MAP is configured such that the MAP in the second embodiment additionally has the UM_FROZEN_PUBLIC state to which a memory region can be changed from the UM_PUBLIC state and in which tasks that belong to the same process can perform a read access.

A configuration of a multicore processor system according to the sixth embodiment is equal to that of the second embodiment, except the content of functions that are included in the state transition function 26, and therefore, a redundant explanation of the configuration excluding the functions included in the state transition function 26 is omitted.

Figure 50:
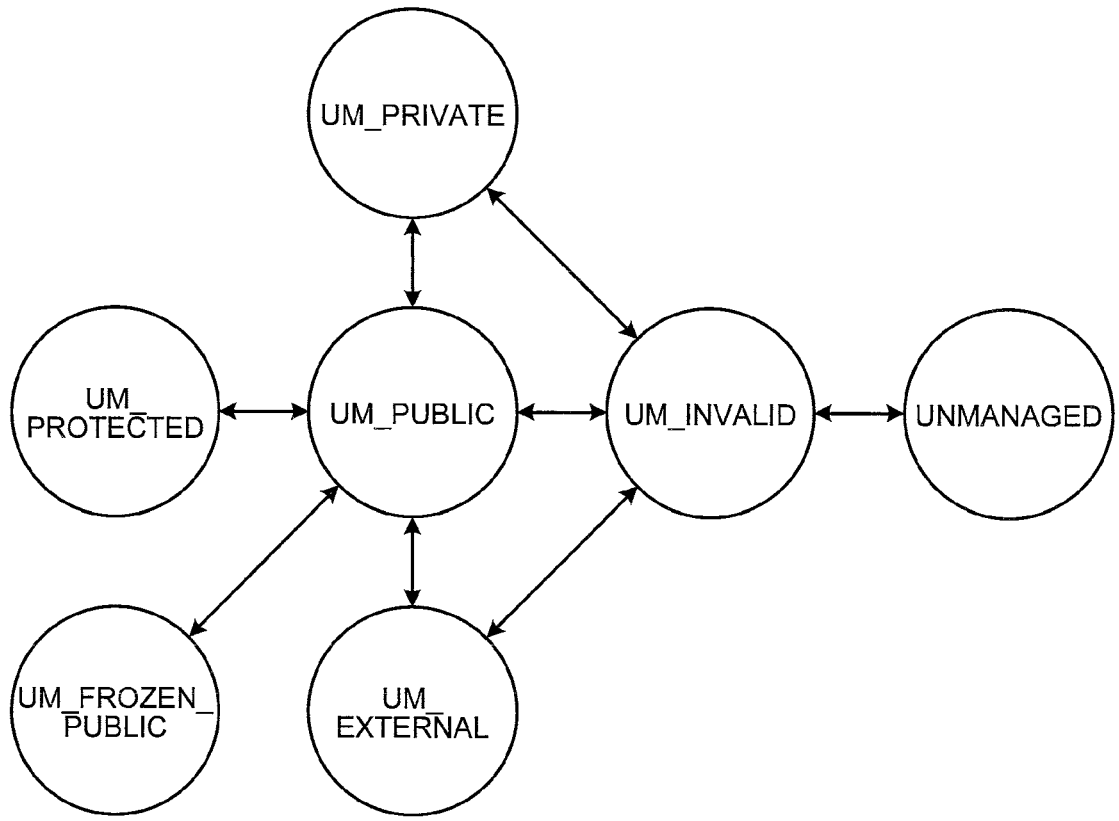
FIG. 50 is an explanatory diagram of a MAP according to a sixth embodiment.

FIG. 50 is an explanatory diagram of the MAP according to the sixth embodiment. The MAP according to the sixth embodiment has the following UM_FROZEN_PUBLIC state added to the MAP according to the second embodiment explained in (g) to (l).

(p) The UM_FROZEN_PUBLIC state

In this state, a memory region can be changed from the UM_PUBLIC state, and all tasks 29 within the same process can perform a read only access by the L1C/L2C.

The state transition function 26 according to the sixth embodiment further includes the following two functions, in addition to the functions explained in (15) to (28).

(35) freeze_um_public_memory (void *addr, size_t size)

This is a function that changes a memory region in the UM_PUBLIC state that is specified by the header address "addr" and the argument "size", from the UM_PUBLIC state to the UM_FROZEN_PUBLIC state. Only the task 29 that belongs to the process that is permitted to share in the UM_PUBLIC state can call this function.

(36) melt_um_frozen_public_memory (void *addr, size_t size)

This is a function that changes a memory region in the UM_FROZEN_PUBLIC state that is specified by the header address "addr" and the argument "size", from the UM_FROZEN_PUBLIC state to the UM_PUBLIC state.

Operation of each function that is included in the state transition function 26 in the sixth embodiment is explained next. Only the operations of the freeze_um_public_memory function and the melt_um_frozen_public_memory function are explained here.

Figure 51:
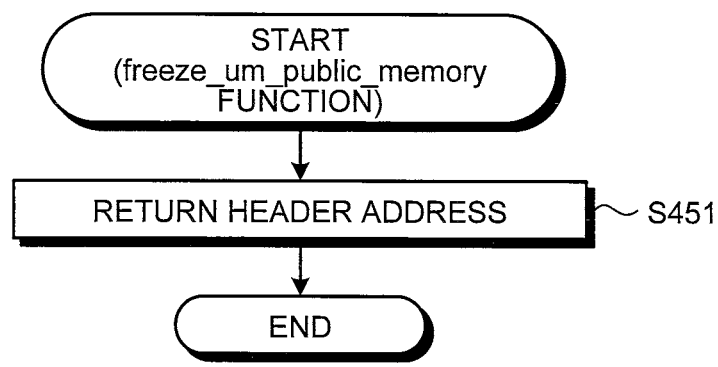
FIG. 51 is a flowchart for explaining operation of freeze_um_public_memory function.

FIG. 51 is a flowchart for explaining the operation of the freeze_um_public_memory function. When the task 29 that belongs to the process that is permitted to share a memory region in the UM_PUBLIC state calls the freeze_um_public_memory function, by specifying this memory region in the UM_PUBLIC state, the freeze_um_public_memory function returns the header address of the specified memory region (S451), and ends the operation. The task 29 of the caller of the freeze_um_public_memory function and other tasks 29 that belong to the same process as that of this caller task 29 can use the memory region that is assigned by the address returned at S451 and the argument "size", as a memory region in the UM_FROZEN_PUBLIC state.

Figure 52:
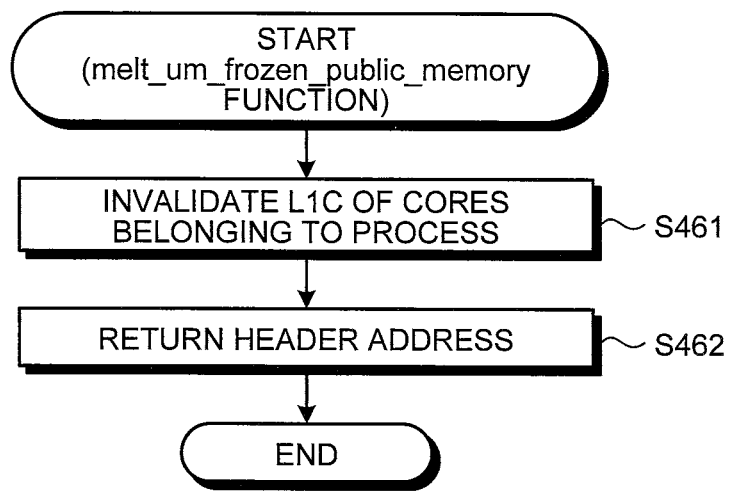
FIG. 52 is a flowchart for explaining operation of melt_um_frozen_public_memory function.

FIG. 52 is a flowchart for explaining the operation of the melt_um_frozen_public_memory function. When the task 29 calls the melt_um_frozen_public_memory function, the melt_um_frozen_public_memory function invalidates the cache lines of the L1C 22 of the process to which the task 29 belongs, on which the content of the specified memory region resides, by using the cache/memory management unit 28 (S461). The melt_um_frozen_public_memory function returns the header address of the specified region (S462), and ends the operation. The caller task 29 and other tasks 29 that belong to the same process as that of this caller task 29 can use the memory region that is assigned by the address returned at S462 and the argument "size", as a memory region in the UM_PUBLIC state.

As explained above, according to the sixth embodiment, because the UM_FROZEN_PUBLIC state in which the tasks that belong to the same process are permitted to perform a read only access by the L1C/L2C is added to the MAP, plural tasks that belong to the same process can simultaneously read by using the L1C and the L2C. Therefore, the tasks can exchange data within the same process at a high speed.

Further, because a memory region can be directly changed from the UM_PUBLIC state to the UM_FROZEN_PUBLIC state without via the UM_EXTERNAL state, when data is desired to be shared within one process, data can be shared more simply than in the third embodiment.

As explained above, according to the first to sixth embodiments, the multicore processor system 1 of a cluster type can maintain consistency of the caches (the L1C 22, the L2C 24) by software.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A multicore processor system comprising:
a memory including a memory region; and
a multicore processor including:
   a plurality of processor cores;
   a first cache corresponding to each one of the processor cores;
   a second cache shared between the processor cores, in which processor cores that share a mapping setting to the memory region form a core group; and
   an address translation unit configured to manage the mapping setting for each of the processor cores, wherein
the memory region permits:
   a first state in which reading and writing by a first access by using both the first cache and the second cache is permitted, and in which only one processor core among the processor cores is permitted to use the memory;
   a second state in which reading and writing by a second access by not using the first cache but by using the second cache is permitted, and in which all of the processor cores belonging to only one core group are permitted to use the memory region; and
   a third state in which reading and writing by a third access by not using either the first cache or the second cache is permitted, and in which all of the processor cores are permitted to use the memory region, wherein
the multicore processor comprises a kernel unit that makes transition of the memory region between the first state and the second state and between the second state and the third state,
the kernel unit writes back the first cache corresponding to the first state to the second cache when the kernel unit makes a transition of the memory region from the first state to the second state, and writes back the second cache corresponding to the second state to the memory region when the kernel unit makes a transition of the memory region from the second state to the third state, and
the address translation unit maps a plurality of virtual addresses to a physical address of the memory region for each state of the memory region, and
each one of the processor cores uses a virtual address among the virtual addresses according to the state of the memory region.

2. The multicore processor system according to claim 1, wherein
the memory region further permits a fourth state in which the memory region is allocated to none of the processor cores, and
the kernel unit makes transition of the memory region between at least one of the first to third states and the fourth state.

3. The multicore processor system according to claim 1, wherein
the memory region further permits a fifth state,
the kernel unit makes transition of the memory region between the second state and the fifth state, and
the fifth state is a state in which reading by the first access is permitted, and in which any one of the processor cores which belongs to only one core group among the processor cores and requests transition of the memory region from the second state to the fifth state is permitted to use the memory region.

4. The multicore processor system according to claim 1, wherein
the memory region further permits a sixth state,
the kernel unit makes transition of the memory region between the third state and the sixth state, and
the sixth state is a state in which reading by the first access is permitted, and in which all of the processor cores belonging to one or more core group which requests transition of the memory region to the sixth state are permitted to use the memory region.

5. The multicore processor system according to claim 1, wherein
the memory region further permits a seventh state,
the kernel unit makes transition of the memory region between the second state and the seventh state, and
the seventh state is a state in which reading by the first access is permitted, and in which all of the processor cores belonging to only one core group are permitted to use the memory region.

6. A multicore processor system comprising:
a memory including—a memory region; and
a multicore processor including a plurality of processor cores each comprising a first cache, a kernel unit, and a second cache shared between the processor cores, in which processor cores that share mapping setting to the memory region form a core group, wherein
the memory region permits a plurality of states for the plurality of processor cores and does not permit the plurality of states for the kernel unit, the plurality of states including:
  a first state in which reading and writing by using both the first cache and the second cache is permitted, and in which only one processor core among the processor cores is permitted to use the memory region;
  a second state in which reading and writing is not permitted, and in which the memory region is assigned to all of the processor cores belonging to only one core group; and
  a third state in which reading and writing is not permitted, and in which the memory region is assigned to all of the processor cores, wherein
the kernel unit makes transition of the memory region between the first state and the second state and between the second state and the third state, and
writes back the first cache corresponding to the first state to the second cache when the kernel unit makes transition of the memory region from the first state to the second state, and writes back the second cache corresponding to the second state to the memory region when the kernel unit makes transition of the memory region from the second state to the third state.

7. The multicore processor system according to claim 6, wherein
the plurality of states further includes a fourth state in which the memory region is allocated to none of the processor cores, and
the kernel unit makes transition of the memory region between at least one of the first to third states and the fourth state.

8. The multicore processor system according to claim 6, wherein
the plurality of states further includes a fifth state,
the kernel unit makes transition of the memory region between the second state and the fifth state,
the fifth state is a state in which reading by an access by using both the first cache and the second cache is permitted, and in which any one of the processor cores which:
belongs to only one core group; and
requests transition of the memory region from the second state to the fifth state is permitted to use the memory region.

9. The multicore processor system according to claim 6, wherein
the plurality of states further includes a sixth state,
the kernel unit makes transition of the memory region between the third state and the sixth state, and
the sixth state is a state in which reading by an access by using both the first cache and the second cache is permitted, and in which all of the processor cores belonging to one or more core group which request transition of the memory region to the sixth state are permitted to use the memory region.

10. The multicore processor system according to claim 6, wherein
the plurality of states further includes a seventh state,
the kernel unit makes transition of the memory region between the second state and the seventh state, and
the seventh state is a state in which reading by an access by using both the first cache and the second cache is permitted, and in which all of the processor cores belonging to only one core group are permitted to use the memory region.

11. A multicore processor that is connected to memory which comprises a memory region and that comprises a plurality of processor cores, a first cache corresponding to each one of the processor cores, a second cache shared between the processor cores, in which processor cores that share a mapping setting to the memory region form a core group, and an address translation unit that manages the mapping setting for each one of the processor cores, wherein
the memory region permits:
  a first state in which reading and writing by a first access by using both the first cache and the second cache is permitted, and in which only one of the processor cores is permitted to use the memory region;
  a second state in which reading and writing by a second access by not using the first cache but by using the second cache is permitted, and in which all of the processor cores belonging to only one core group among the processor cores are permitted to use the memory region; and
  a third state in which reading and writing by a third access by not using either the first cache or the second cache is permitted, and in which all of the processor cores are permitted to use the memory region,
the multicore processor includes a kernel unit that makes transition of the memory region between the first state and the second state and between the second state and the third state,
the kernel unit writes back the first cache corresponding to the first state to the second cache when the kernel unit makes a transition of the memory region from the first state to the second state, and writes back the second cache corresponding to the second state to the memory region when the kernel unit makes a transition of the memory region from the second state to the third state, and
the address translation unit maps a plurality of virtual addresses to a physical address of the memory region for each state of the memory region, and each one of the processor cores uses a virtual address among the virtual addresses according to the state of the memory region.

12. The multicore processor according to claim 11, wherein
the memory region further permits a fourth state in which the memory region is allocated to none of the processor cores, and
the kernel unit makes transition of the memory region between at least one of the first to third states and the fourth state.

13. The multicore processor according to claim 11, wherein
the memory region further permits a fifth state,
the kernel unit makes transition of the memory region between the second state and the fifth state, and
the fifth state is a state in which reading by the first access is permitted, and in which any one of the processor cores which belong to only one core group and request transition of the memory region from the second state to the fifth state is permitted to use the memory region.

14. The multicore processor according to claim 11, wherein
the memory region further permits a sixth state,
the kernel unit makes transition of the memory region between the third state and the sixth state, and
the sixth state is a state in which reading by the first access is permitted, and in which any one of the processor cores belonging to one or more core group which request transition of the memory region to the sixth state is permitted to use the memory region.

15. The multicore processor according to claim 11, wherein
the memory region further permits a seventh state,
the kernel unit makes transition of the memory region between the second state and the seventh state, and
the seventh state is a state in which reading by the first access is permitted, and in which any one of the processor cores belonging to only one core group is permitted to use the memory region.

\* \* \* \* \*